US012628153B2

(12) United States Patent
Dees et al.

(10) Patent No.: US 12,628,153 B2
(45) Date of Patent: May 12, 2026

(54) ENHANCED SCHEDULING IN WIRELESS NETWORKS WITH RELAY FUNCTION

(71) Applicant: KONINKLIJKE PHILIPS N.V., Eindhoven (NL)

(72) Inventors: Walter Dees, Eindhoven (NL); Esko Olavi Dijk, Utrecht (NL)

(73) Assignee: Koninklijke Philips N.V., Eindhoven (NL)

( * ) Notice: Subject to any disclaimer, the term of this patent is extended or adjusted under 35 U.S.C. 154(b) by 690 days.

(21) Appl. No.: 17/920,818

(22) PCT Filed: Apr. 21, 2021

(86) PCT No.: PCT/EP2021/060299
§ 371 (c)(1),
(2) Date: Oct. 24, 2022

(87) PCT Pub. No.: WO2021/214095
PCT Pub. Date: Oct. 28, 2021

(65) Prior Publication Data
US 2023/0345456 A1 Oct. 26, 2023

(30) Foreign Application Priority Data

Apr. 22, 2020 (EP) ..................................... 20170956
Apr. 1, 2021 (EP) ..................................... 21166763

(51) Int. Cl.
*H04W 72/1263* (2023.01)
*H04W 28/02* (2009.01)
(Continued)

(52) U.S. Cl.
CPC ... *H04W 72/1263* (2013.01); *H04W 28/0278* (2013.01); *H04W 72/25* (2023.01); *H04W 88/04* (2013.01)

(58) Field of Classification Search
CPC ......... H04W 72/1263; H04W 28/0278; H04W 72/25; H04W 88/04; H04W 40/04; H04W 76/14; H04W 72/12; H04L 47/30
(Continued)

(56) References Cited

U.S. PATENT DOCUMENTS 7,590,064 B1 * 9/2009 Zhang ..................... H04W 8/04
370/235
8,576,714 B2 11/2013 Yang
(Continued)

FOREIGN PATENT DOCUMENTS

JP 2019176266 A 10/2019

*Primary Examiner* — Rownak Islam

(57) ABSTRACT

Enhanced scheduling in wireless networks with relay function In cellular or other wireless networks, relay terminal devices can be introduced to support an indirect network connection for remote terminal devices in out-of-coverage (OoC) areas to thereby improve network coverage. Such relay terminal devices buffer upstream and downstream data from/to other terminal devices that are indirectly connected. However, a relay terminal device may have a limited memory allocation for buffering. This limitation has a high impact on the optimal resource scheduling performed by network access devices. It is therefore proposed to have relay terminal devices report information about their available or maximum buffer capacity to their respective network access devices to enable optimal resource scheduling by the access devices.

16 Claims, 4 Drawing Sheets

(51) Int. Cl.
H04W 72/25         (2023.01)
H04W 88/04         (2009.01)

(58) Field of Classification Search
USPC .......................................................... 370/329
See application file for complete search history.

(56)                     References Cited

U.S. PATENT DOCUMENTS

2010/0302946 A1*  12/2010  Yang ....................... H04L 47/30
                                                                          370/235
2012/0250605 A1    10/2012  Du
2018/0054756 A1     2/2018  Kahtava
2019/0373493 A1    12/2019  Uchiyama

* cited by examiner

S501

S502

S503

S504

ENHANCED SCHEDULING IN WIRELESS NETWORKS WITH RELAY FUNCTION

CROSS REFERENCE TO RELATED APPLICATIONS

This application is a U.S. national phase application of International Application No. PCT/EP2021/060299 filed on Apr. 21, 2021, which claims the benefit of EP Application Serial No. 20170956.5 filed on Apr. 22, 2020 and EP Application Serial No. 21166763.9 filed Apr. 1, 2021 and are incorporated herein by reference.

FIELD OF THE INVENTION

The invention relates to resource scheduling in wireless networks with relay function, such as—but not limited to—cellular networks with indirect network connections for remote communication devices (e.g. terminal devices such as user equipments (UEs)) which are out of network coverage.

BACKGROUND OF THE INVENTION

Many wireless communication systems use network access devices (such as base stations, Node Bs (eNBs, eNodeBs, gNBs, gNodeBs, ng-eNBs, etc.), access points or the like) to provide geographical service areas where wireless communication devices (e.g. terminal devices such as mobile stations or UEs) communicate with an access device serving a particular geographical service area in which the terminal devices are located. The access devices are connected within a network allowing communication links to be made between the wireless communication devices and other devices. In some circumstances, the communication links are between wireless communication devices that are close to each other. In these situations, it may be desirable to have a direct communication link between two wireless communication devices rather than communicating through an access device. Such direct communication between communication devices is often referred to as device-to-device (D2D) communication or peer-to-peer (P2P) communication. The communication resources (e.g., time-frequency blocks) used for D2D or P2P communication can be a subset of the communication resources used by the communication system for communication between wireless communication devices and access devices or they can be a different set of communication resources (e.g. unlicensed band or millimeter wave band).

An in-coverage (InC) communication device is a communication device that is within the service area of an access device and is capable of communication with the access device. An out-of-coverage (OoC) device or remote communication device is typically a communication device that is not within a service area of any access device or that is in the service area of an access device but the access device does not allow access (e.g. because it is a non-public network (NPN) access device).

Service requirements related to wireless communication systems consider D2D in different ways. A first approach is to use direct device connection without any network entity in the middle. A second approach is to provide a relay communication device between two remote devices. A third approach is to provide a relay communication device between a remote communication device and the network. This is called indirect network connection mode. The relay communication device may use multiple access schemes such as 5G New Radio (NR) radio access technology, Long Term Evolution (LTE), WiFi, or fixed broadband.

Radio frequency resources are considered an expensive utility whose management has been of a great challenge for the evolution of cellular networks. On top of that, data traffic with strict latency and reliability requirements in upcoming cellular networks requires an efficient resource allocation scheme to make it a success.

In a radio access network (RAN), access devices should schedule communication resources for transmission for all communication devices to obtain maximum efficiency of spectrum resource usage. In a RAN that supports indirect network connections, this includes scheduling for any indirectly connected remote or relay communication device.

Therefore, scheduling should be extended to work for directly and indirectly connected communication devices, including those communication devices that are indirectly connected via two or more relay communication devices ("multi-hop"). In addition, scheduling solutions should take into account that a relay communication device may have limited buffer memory space available to buffer data for relayed data flows. The access device should therefore perform scheduling in a manner such that buffer overflows and resultant data loss do not occur. Moreover, scheduling solutions should take into account that buffer memory available at a relay communication device to buffer data for a specific upstream parent or downstream child communication device may vary per device type (e.g. low-cost Internet of Things (IoT) node versus powerful mobile phone) and over time (e.g. if a relay communication device has only one child remote communication device at a given time, it may have far more buffer memory available for that child device than if it has fifteen downstream communication devices assigned to it).

SUMMARY OF THE INVENTION

It is an object of the present invention to provide an extended scheduling procedure that also considers indirectly connected communication devices in wireless networks.

This object is achieved by an apparatus as claimed in claims 1 and 4, by an access device as claimed in claim 12, by a communication device as claimed in claim 13, by method as claimed in claims 14 and 15, and by a computer program product as claimed in claim 16.

According to a first aspect, an apparatus is provided (e.g. at an access device, at a relay communication device or at a remote communication device) for scheduling communication resources of at least one communication device in a wireless network, wherein the apparatus comprises a capacity detector configured to detect a buffer capacity information signaled from the wireless network and indicating available or maximum buffer capacity of at least one relay communication device; and a scheduler configured to schedule communication resources for at least one of a transmission of upstream or downstream data for a target communication device over a device-to-device communication channel between the target communication device and the at least one relay communication device, and a transmission of upstream or downstream data for the at least one relay communication device over a device-to-device communication channel between the at least one relay communication device and another relay communication device or over a direct radio access link between the at least one relay communication device and an access device, based on the received buffer capacity information.

As mentioned above, the apparatus of the first aspect of the invention may also be included in a remote communication device. This may be possible for example when the remote communication device operates in a resource self-scheduling mode. In such a mode, a remote communication device will select the resources it can itself use for example in a pool of resources available to one or more remote communication devices. This could for example be the case of a Remote UE implementing the Scheduling mode 2 of Sidelink. In such a case, the target communication device corresponds to the remote communication device itself. As also mentioned above, the apparatus of the first aspect of the invention may also be included in a relay communication device. This may be possible for example when the relay communication device operates in a resource self-scheduling mode. In such a mode, a relay communication device will select the resources it can itself use for example in a pool of resources available to one or more relay communication devices. This could for example be the case of a Relay UE implementing the Scheduling mode 2 of Sidelink because it is out of coverage of an access device. In such a case, the target communication device corresponds to the relay communication device itself.

According to a second aspect, an apparatus is provided (e.g. at a communication device) for controlling scheduling of communication resources of at least one communication device in a wireless network, wherein the apparatus comprises a capacity detector configured to determine an available or maximum buffer capacity of a data buffer at a relay communication device; and a capacity reporter for reporting a buffer capacity information including the determined available or maximum buffer capacity to the wireless network in response to a trigger event.

According to a third aspect, an access device comprising the apparatus of the first aspect is provided.

According to a fourth aspect, a communication device comprising the apparatus of the first or the second aspect is provided.

According to a fifth aspect, a method of scheduling communication resources of at least one communication device in a wireless network is provided, wherein the method comprises detecting buffer capacity information signaled from the wireless network and indicating available or maximum buffer capacity of at least one relay communication device; and scheduling at least one of a transmission of upstream or downstream data for a target communication device over a device-to-device communication channel between the target communication device and the at least one relay communication device, and a transmission of upstream or downstream data for the at least one relay communication device over a device-to-device communication channel between the at least one relay communication device and another relay communication device or over a direct radio access link between the at least one relay communication device and an access device, based on the received buffer capacity information.

According to a sixth aspect, a method of controlling scheduling of communication resources of at least one communication device in a wireless network is provided, wherein the method comprises determining an available or maximum buffer capacity of a data buffer at a relay communication device; and reporting the determined available or maximum buffer capacity to the wireless network in response to a trigger event.

Finally, according to a seventh aspect, a computer program product is provided, which comprises code means for producing the steps of the above methods according to the fifth or sixth aspects when run on a computer device.

Accordingly, the scheduler at the access device receives required buffer capacity information from directly and indirectly connected remote and/or relay communication devices and is thereby enabled to optimally schedule communication resources for directly and/or indirectly connected remote or relay communication devices, avoiding buffer overflow in relay communication devices, congestion and data loss. Communication resources may thus be scheduled for indirectly connected remote or relay communication devices. Thereby, access devices may also consider indirectly connected communication devices and their available buffer capacities when scheduling communication resources.

According to a first option which may be combined with any of the above first to seventh aspects, the scheduling may be adapted to decide based on the received buffer capacity information to add an additional parent relay communication device and/or remove an existing parent relay communication device for one of a relay or remote communication device in the wireless network. This also includes the case of substituting one parent relay communication device by another. Thereby, additional relay data buffer capacity and additional communication resources can be scheduled to increase data throughput for a specific data flow to or from the relay or remote communication device. E.g., the decision may be followed by an instruction message sent to one or both of the relay or remote communication device and the additional parent relay communication device. Optionally, one new parent relay communication device can be added and, at the same time, the existing parent relay communication device may stop acting as a parent relay for that particular relay or remote communication device. As an alternative, the instruction message could be provided indirectly via the core network. After receipt, the instruction message may trigger addition of the additional upstream relay communication device.

According to a second option which may be combined with the first option or any of the above first to seventh aspects, the scheduling may be adapted to perform buffer capacity control by at least one of commanding a relay communication device to increase or decrease a buffer capacity for a specific logical channel or logical channel group, or a specific downstream relay or remote communication device, switching the relay communication device between an autonomous mode of buffer allocation and a directed mode of buffer allocation, setting a buffer allocation policy at the relay communication device, setting a reporting granularity of the relay communication device, and commanding the relay communication device to merge multiple separate buffers into one buffer allocation. These alternative or cumulative buffer capacity control options enable effective, flexible and fast resource scheduling in wireless networks with directly and indirectly connected communication devices.

According to a third option which can be combined with the first or second option or any of the above first to seventh aspects, buffer capacity reporting may be adapted to send the buffer capacity information to a network function which forwards the buffer capacity information to a scheduling access device of the wireless network. This measure provides the advantage that buffer capacity information does not have to be directly reported to the access device but can be forwarded to other network functions to provide enhanced reporting flexibility.

According to a fourth option which can be combined with any of the first to third options or any of the above first to seventh aspects, the buffer capacity information may be reported in an absolute format or in a relative format. Thereby, the reported buffer capacity information can be adapted to individual requirements of selected formats or channels used for transferring the buffer capacity information.

According to a fifth option which can be combined with any of the first to fourth options or any of the above first to seventh aspects, buffer capacity reporting can be combined by reporting the buffer capacity information for at least one of different logical channels present for at least one upstream link and/or at least one downstream link of a relay communication device, different priority classes of buffered data present in the relay communication device, and different downstream communication devices present for the relay communication device, or by combining buffer capacity reports of one or more downstream relay communication devices with an own buffer capacity report. Such a combination of reported buffer capacity information of different sources leads to an enhanced efficiency and speed of reporting and resource scheduling.

According to a sixth option which can be combined with any of the first to fifth options or any of the above first to seventh aspects, buffer capacity information can be combined by reporting a binary payload in which a plurality of elements are concatenated, each element corresponding to a buffer capacity report of one logical channel of the relay communication device, or by including the own buffer capacity report and/or a buffer capacity report of a sidelink connected communication device into a combined buffer capacity report, or by summarizing buffer capacity information into a more condensed buffer capacity report, or by reporting pairs of logical channels or logical channel groups and related buffer capacity reports, or by reporting pairs of data priority classes and related buffer capacity reports, or by selecting more relevant or urgent buffer capacity reports for prioritized reporting, or by combining at least one buffer capacity report and at least one buffer size report into one report. Such a combination of reported capacity and/or size information of different sources leads to an enhanced efficiency and speed of reporting and resource scheduling. A specific example of a buffer size report may be a 3GPP BSR MAC CE as described later.

According to a seventh option which can be combined with any of the first to sixth options or any of the above first to seventh aspects, buffer capacity reports can be encoded by at least one of using a buffer capacity index for a look-up table, using a current buffer load percentage, mapping reported buffer capacity to capacity categories, using a flag indicating whether a buffer capacity threshold has been reached or exceeded, using a compound value indicating a resource usage of the relay communication device where said value is at least partly determined by the relay communication device current buffer capacity, using a compound value indicating a preference or ability of the relay communication device for accepting an additional remote communication device where said value is partly determined by the relay communication device current buffer capacity, including meta information about a buffer, and including specific requests triggered by buffer-related conditions. Such coding approaches provide the advantage that the reporting load can be minimized by adapting it to individual resource scheduling requirements.

It is to be noted that the proposed compound values enable to report the relay communication device load (for example the current resource usage or the ability of accepting other remote communication device connection(s)) along with an indication of buffer capacity. This can thus enable the scheduler to make the most suitable decision in scheduling.

Alternatively to or in combination with the seventh option, information about the buffer load can be reported. It is for example proposed for the capacity reporter (33) to include in a buffer capacity report information related to, or encode a buffer capacity report, at least one of an index for a buffer load look-up table, a current buffer load percentage, a past buffer load, a mapping of reported buffer load to load categories, a flag indicating whether a buffer load threshold has been reached or exceeded, a compound value indicating a resource usage of the relay communication device where said value is at least partly determined by its current or a past buffer load, or a compound value indicating a preference or ability of the relay communication device for accepting an additional remote communication device where said value is at least partly determined by its current or a past buffer load.

According to an eighth option which can be combined with any of the first to seventh options or any of the above first to seventh aspects, buffer capacity reporting may be achieved by using at least one of or a combination of a transport protocol on top of the Internet Protocol, a message of a radio resource control protocol, a packet data unit of a packet data convergence protocol, a control element of a media access control (MAC) protocol, a service data unit of the MAC protocol, and a data format of an uplink control information or a sidelink control information. The use of the service data unit covers a case where the buffer capacity report is transported inside a MAC payload but not as control element. These different transmission options provide for flexible implementation of the proposed scheduling and reporting solutions.

According to a ninth option which can be combined with any of the first to eighth options or any of the above first to seventh aspects, the trigger event may correspond to at least one of a change of a maximum buffer capacity on a relay communication device to a lower capacity, a change of an available buffer capacity of a data buffer, a timer-based trigger, an increase of a load of a data buffer by a predetermined percentage, fraction or data size with respect to a previous reported buffer capacity information, a receipt of a buffer capacity query from a scheduling access device or an upstream relay communication device, a change of a buffer capacity on a remote communication device, a receipt of a buffer size or capacity report from a downstream remote or relay communication device, a receipt of a buffer status message or scheduling request message from a downstream remote or relay communication device, a receipt of a communication resource request message from a downstream remote or relay communication device, a receipt of a discovery or status request message from a downstream device or out-of-coverage communication device, a receipt of a request from an access device, and a receipt of a recommended bit rate message or recommended bit rate query message from a downstream remote or relay communication device. These trigger options allow fast and efficient responsiveness of the proposed scheduling and reporting solutions towards changing buffer capacity conditions and/or radio channel conditions. The threshold may thus be defined as a fraction or percentage of a buffer capacity used (which is also called "buffer load") or as an absolute size of buffered data. One example of the scheduling request message could be a scheduling request (SR) bit sent in a sidelink control information (SCI). As another example, it could be a resource request inside a radio resource control (RRC) message.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatuses of claims 1 and 4, the access device of claim 12, the communication device of claim 13, the methods of claims 14 and 15, and the computer program product of claim 16 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
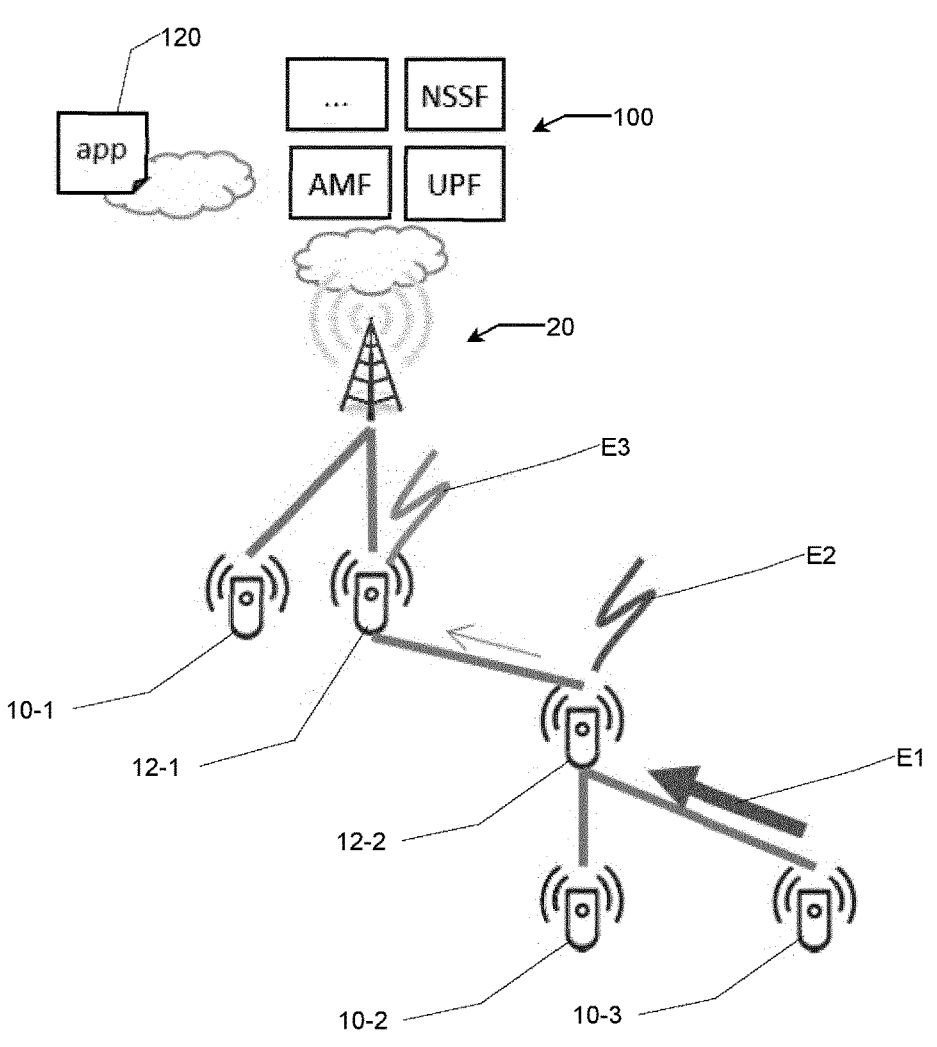
FIG. 1 schematically shows a network architecture with a buffer overflow issue in a relay communication device.

Embodiments of the present invention are now described based on a resource scheduling for 5G cellular networks in which UE-to-network relay functions are enabled, where 4G network elements may be incorporated in the proposed 5G solutions. Furthermore, at least some of the below embodiments are described based on a 5G New Radio (5G NR) radio access technology. Specifically, the relay functions enable multi-hop indirect network connections for remote communication devices (e.g. UEs). This is done to achieve improved coverage for communication devices and improved low-power operation for IoT communication devices specifically.

Throughout the present disclosure, the abbreviations "eNB" (4G terminology) and "gNB" (5G terminology) are intended to mean access device such as a cellular base station or a WiFi access point. The eNB/gNB is part of the radio access network (RAN), which provides an interface to functions in the core network (CN). The RAN is part of a wireless communication network. It implements a radio access technology (RAT). Conceptually, it resides between a communication device such as a mobile phone, a computer, or any remotely controlled machine and provides connection with its CN. The CN is the communication network's core part, which offers numerous services to customers who are interconnected via the RAN. More specifically, it directs communication streams over the communication network and possibly other networks. In the 3GPP specifications TS 23.303 and TS 24.334 for 4G networks, so-called proximity service (ProSe) functions are defined to enable—amongst others—connectivity for cellular communication devices (e.g UEs) that are temporarily not in coverage of an access device (eNB). This particular function is called ProSe UE-to-network relay, or Relay UE. The Relay UE is a communication device that helps another OoC UE to communicate to the eNB (i.e. access device) by relaying application and network data traffic in two directions between the OoC UE and the eNB. The local communication between the Relay UE and the OoC UE is called D2D communication or Sidelink communication or PC5 communication. The abbreviation "PC5" designates an interface for sidelink communication as defined by ProSe. Furthermore, the abbreviation "UL" is used for the uplink direction from the communication device (e.g. UE) to the access device (e.g. eNB, gNB), the abbreviation "DL" for the downlink direction from the access device (e.g. eNB, gNB) to the communication device (e.g. UE), and the abbreviation "SL" for sidelink communication between two or more communication devices (e.g. UEs).

Once the relaying relation is established, the OoC-UE is connected via the Relay UE and acts in a role of "Remote UE". This situation means the Remote UE has an indirect network connection to the CN as opposed to a direct network connection that is the normal case (cf. 3GPP specification TS 22.261 v16.10.0). The term "upstream" is used for data destined towards an access device or to indicate a communication device that is closer (in terms of number of hops) to an access device, while the term "downstream" is used for data flows from an access device destined towards a communication device in the RAN or to indicate a communication device that is further away (in terms of number of hops) from an access device. A prefix "parent" denotes an upstream relay communication device being used by a remote or relay communication device, and a prefix "child" denotes a downstream relay communication device that is connected to a given relay communication device, or a downstream remote communication device that is directly using a particular relay communication device as a parent.

Ongoing standardization work (e.g. 3GPP specification TR 22.866 v17.1.0) extends the concept of single-hop relay to support communication over multiple wireless hops and the use of relays for commercial or IoT application areas. ProSe Release 15 only allows relay communication devices that provide a single hop towards the network (access device), to enable a remote communication device to have an indirect network connection to the access device (e.g. eNB) and the 4G CN. For a future 3GPP release beyond Release 16, the aim is to enable multi-hop relaying for 5G systems, where Relay UEs can be connected to other Relay UEs and so on.

An upcoming standardization step (which started in 3GPP specification TR 23.752 v0.3.0) is to integrate ProSe for UE-based relaying into 5G based networks and specifications. The expectation is that the 4G ProSe concepts will be re-used as much as possible in 5G specifications, wherein the 5G V2X architecture (cf. 3GPP specification TS 23.287 v16.1.0) serves as a starting point.

Furthermore, 3GPP specifications TR 23.733 v15.1.0 and TR 36.746 v15.1.1 provide studies on architectural enhancements e.g. to enable an IoT device (in a role of Remote UE) to operate on very low power by using a Relay UE to connect to the wider network. Because the Relay UE is physically very close, it can be reached using very low power transmissions. This work also includes security, speed and stability improvements to ProSe. These extensions of ProSe are called enhanced ProSe ("eProSe").

One proposed improvement in eProSe is an enhanced relaying architecture that operates in the second protocol layer (i.e. L2) intended to offer end-to-end Internet Protocol (IP) packet and Packet Data Convergence Protocol (PDCP) packet transmissions to remote communication devices for application and/or user data. A benefit of this architecture is that the remote communication devices becomes directly visible as a registered entity in the CN, which is relevant for monitoring and billing purposes and for improved control by the access device over the communication device.

Because the characteristics of wireless communication devices differ vastly, e.g. in terms of low-power operation, tolerated maximum latency, achievable transmit output power, achievable duty cycle in transmission and/or reception, required bandwidth and mobility, the wireless network systems such as the 5G system are designed to be very flexible in how they can operate. The bandwidth available to a device for UL data, SL data and DL data can be dynamically varied under control of an access device based on data needs and on channel conditions at that point in time. To achieve this, a scheduler exists inside an access device to schedule communication resources (e.g. as described in 3GPP specification TS 38.300) for UL/DL/SL transmissions of communication devices and to (help) make resource-related or relay-topology-related decisions for the RAN, in order to optimize the quality of service for all communication devices served directly or indirectly by the access device. UL/DL control information is sent to communication devices in various ways to convey the scheduling decisions.

Resource scheduling may be dynamic, which means that communication resources are allocated on demand based on available data and channel conditions. The semi-persistent scheduling (SPS) is a preset schedule that can be quickly activated/deactivated by the access device (e.g. gNB) based on present demand. As a further option, a persistent schedule may be applied, that is activated once and stays active until explicitly cleared by certain specified events. The idea is that dynamic scheduling decisions can be added on top of persistent/semi-persistent ones, to cope with variation in data rate or special occurrences such as a data retransmission. For the scheduler to learn about channel conditions, a complex ensemble of reporting structures is defined in 3GPP specifications to report measurements to access devices (e.g. gNBs), together with control mechanisms for access devices (e.g. gNB) to enable/disable/request reports. So, these reports are controlling the scheduling process. Although most of the scheduling process is directly controlled by the scheduler in the access device, the process of scheduling of communication resources in the wireless network relies also on local decisions taken by communication devices not under direct control of the scheduler. For example, selection of a relay communication device by a remote communication device or by a relay communication device, or reselection of a relay communication device by a remote communication device or by a relay communication device, or self-scheduled resource selection of resources (e.g. as in mode 2 defined in 3GPP specification TS 38.300 for sidelink communication) used to transmit a message by a remote communication device that is not in direct coverage of an access device and/or is not being scheduled by an access device currently. These local decisions in turn impact and constrain the scheduling decisions that the scheduler in the access device can make. At the same time, the scheduler may have means to directly or indirectly influence these local decisions taken by communication devices. As an example of direct influence, the access device may provide a command or request directly to a remote communication device to reselect a particular other parent relay communication device to achieve better quality of service for one or more communication devices in the RAN. As an example of indirect influence, an access device may configure additional sidelink (SL) resources as a resource pool from which self-scheduling communication devices can select, by local decision, a particular resource to transmit in over SL. In other words, a remote communication device may run its own scheduler to schedule communication resources and may make its own local decisions on which resources to use and at which time from a predefined subset of resources. These local decisions may be based on various inputs such as local measurements (e.g. signal or noise levels, reference signal received power, etc.), locally received messages (e.g. a SCI message) configuration data provided by the access device (e.g. parameters provided via an RRC message), or measurement/configuration data provided by a peer communication device. So, these inputs are also controlling the scheduling process, or in other words these inputs are control inputs to the scheduling process with only a part of the inputs being under control of the scheduler. As a further illustration of this: if a relay communication device reports its buffer capacity information to a remote communication device and the remote communication device uses that information to select another relay communication device, then the relay communication device is effectively controlling the scheduling of communication resources by controlling the assignment of which relay the remote communication device will use and thus which resources the remote communication device will use for its sidelink communication and (indirectly) also the resources offered by the selected relay communication device in the wireless network.

An element for implementing scheduling mechanisms may be the Radio Resource Control (RRC) protocol which can operate end-to-end to UEs, potentially over one or more hops taking into consideration the above new relay architecture on the second protocol layer (i.e. L2). It may be used for non-time-critical, static or semi-static schedule information. In other words, the configuration of schedules. Here, ConfiguredGrantConfig may be an information element for uplink or sidelink scheduling.

Another element for implementing scheduling mechanisms may be control elements (CEs) of the Media Access Control (MAC) protocol, which are short elements (or information elements (IEs)) inserted between existing UL/DL/SL transmissions over the MAC layer, used to efficiently signal certain events, measurements or configurations. A specific example may be a 5G NR buffer status report (BSR) MAC CE that is used by communication devices (e.g. UEs) to signal their current data buffer sizes towards the access device and/or its scheduler. Further MAC CEs may be used by the access device (e.g. gNB) to control the behavior of the communication device (e.g. UE) when executing various other 3GPP mechanisms such as Channel State Information (CSI) reporting, Sounding Reference Signals (SRS), or Discontinuous Reception (DRX).

A further element may be the use of a downlink control information (DCI), which is a short message sent in a low-bitrate control channel (e.g. Physical Downlink Control Channel (PDCCH)) with a special blindly detectable modulation or coding. This mechanism is implemented at the physical protocol layer (PHY L1) and does not need to use the MAC L2 header structure. Here, various DCI formats can be defined with different information content. Communication resources for dynamic scheduling can be indicated in the DCI. A DL data transmission may follow the DCI message after e.g. less than 1 ms but can be scheduled for up to 4 ms ahead. For UL, the scheduling may be made for a next time slot 1-2 ms ahead but can be up to 8 ms ahead.

A still further element may be the use of uplink or sidelink control information (UCI, SCI). This may include a scheduling request (SR) bit used e.g. when no communication resources are available to transmit a BSR MAC CE or other kind of buffer status report. In response to an SR, the scheduler of the access device (e.g. gNB) will allocate uplink communication resources for the communication device (e.g. UE) in the future.

A yet further element may be the use of SL/PC5 discovery messages. Such messages can be used for instance to discover a peer relay communication device for an OoC communication device, to discover potential peer relay communication device(s) for the purpose of relay selection or reselection by a remote or relay communication device, or to query and/or report the current status and load of nearby relay communication devices. The information thus learned from discovery message(s) may then be used by a remote or relay communication device to make a local decision that impacts the scheduling of communication resources. For example, if a remote communication device uses mode 2 resource allocation, it may schedule its sidelink resources differently according to the relay device it has selected or reselected. Also, in case a scheduler in the access device is involved in the resource allocation for remote and/or relay communication devices, and if due to a relay reselection process a better parent relay communication device is selected by such a device, this may enable the scheduler in the access device from that point onwards to schedule its resources overall more efficiently for all the scheduled devices in its RAN. Transmitted discovery messages could be Model A (i.e. Announce) messages sent periodically thus triggered by a timer, or Model B (i.e. discovery response) messages triggered by a received Model B discovery query message from a peer communication device (e.g. based on the Models A and B as specified in TS 23.303).

The above resource scheduling overview is applicable for communication devices (e.g. UE) and could be used for multi-hop solutions as well. Therefore, according to various embodiments, new network elements may need to be added or the existing elements may need to be extended, as described below. If single- or multi-hop relay communication devices are introduced into a network, then existing solutions may not be sufficient because they may operate on a direct link between the access device (e.g. gNB) and the communication device (e.g. UE), and not necessarily on an indirect link between the access device and the communication device via a relay.

In a single-hop relaying situation, OoC remote communication devices (e.g. Remote UEs) could self-schedule their transmissions on an SL connection based on own channel measurements and a random-access process, or an access device (e.g. gNB) could schedule all communication resources for all directly and indirectly connected communication devices (e.g. UEs), or one leading communication device (e.g. UE) of a group of communication devices could coordinate resource assignments to its group members, which could even work if some group members would be OoC but still in a coverage range of the leading group member.

It is noted that when required communication resources for indirectly connected communication devices can be scheduled by an access device (e.g. gNB), the efficiency of spectrum usage may increase while risk of transmission collisions and/or risk of unfair spectrum usage may decrease.

As regards the BSR MAC CE, four different formats are defined in the 3GPP specification TS 38.331 v15.5.1. The BSR may contain an identifier of a logical channel group (LCG), a group of logical channels with their associated buffers for which the buffer size report applies. More specifically, the buffer size report may comprise a buffer size field (e.g. 5 or 8 bits long) where the bit value may be interpreted based on predetermined look-up tables. A short format may be used to report only one LCG, while a long format may be used to report e.g. one to 8 LCGs.

The BSR MAC CE is used as explained above while the SL BSR MAC CE is used to specifically report on the sidelink buffer statuses. Both types of BSR may have different formats depending on the number N of LCGs being reported, e.g. if the number N is odd or even, and depending on whether or not the BSR is truncated. The BSR format may comprise a "destination index" that encodes an index (e.g. 4 bits) into a list that contains the destination address of the data. This could be a unicast destination or a group destination (e.g. multicast D2D/V2X-D2D).

In IP networks, an explicit congestion notification (ECN) mechanism can be used by intermediate routers to signal that congestion is occurring at that router (cf. IETF specification RFC 3168 for details). A congestion could be caused by, for example, an IP source sending too fast or due to insufficient capacity on outgoing links. In both cases the effect can be that a buffer on the router is full or almost full. So, the filling up of a router buffer can be used as a trigger to send an ECN mark along with the data packet to the end destination. The end destination then uses protocol acknowledgements (e.g., Transmit Control Protocol (TCP)) to signal to the source that there is congestion. The source may then use this information to reduce its data rate of sending. ECN can be applied in cellular 4G/5G networks (cf. 3GPP specification TS 36.300 v15.2.0, section 11.6 for 4G networks and TS 38.300 v15.5.0, section 12.2 for 5G networks). The access device (e.g. gNB) itself—e.g. as an intermediate router of IP packets to/from communication devices (e.g. UEs)—can set ECN bits in the IP packet header to indicate congestion, in case of congestion. Per the ECN protocol this will inform the IP data source that it needs to reduce its data rate.

In the following embodiments, the term "buffer" relates to buffering of data to be transmitted over a communication link within a communication network, while the term "buffer size" is intended to express how much data is actually stored in a buffer at a time instant or calculated as a function (e.g. an average) over a particular time period, and the term "buffer capacity" is intended to express how much data could be stored (e.g. additionally, or in total) in the buffer at a time instant or on calculated as a function (e.g. an average) over a particular time period. The term "buffer load" expresses a fraction or percentage of a buffer capacity used at a time instant or averaged over a particular time period.

More specifically, a buffer status information message is a message that includes any kind of buffer status information. The buffer status information may comprise buffer size information (e.g. a Buffer Status Report (BSR) or Sidelink Buffer Status Report (SL-BSR) as defined in related 3GPP specifications) and buffer capacity information. A typical buffer status report (BSR) or Sidelink Buffer Status Report (SL-BSR) as defined in related 3GPP specifications includes only information about the current buffer size. It would be beneficial for better resource scheduling, in particular in a relaying scenario, if also other buffer related information, such as buffer capacity would be reported or managed by an access device or the core network. Therefore, it is proposed to either use a separate message, or extend existing messages (such as buffer status report messages) with information related to buffer capacity, i.e. a so-called buffer capacity report or buffer capacity information. A buffer capacity report may include information about available buffer capacity (relative or absolute value) at the time of reporting or averaged over a past time period, maximum buffer capacity or buffer limit (absolute value), used buffer capacity or buffer load (e.g. fraction of the maximum buffer capacity used) at the time of reporting or averaged over a past time period and meta information (e.g. stable bit) and any other buffer-related status information (e.g. LCID, LCG, UE-ID, buffer ID, buffer capacity alert, etc.).

Moreover, a report is to be understood in a sense that it consists of zero or more included reports (received from other devices) plus zero or more information items, wherein an information item may be internally generated or received from another device in another received report. According to various embodiments, a concept is provided of combining multiple buffer capacity reports into one message (e.g., reports from different nodes or reports from different logical channels, logical channel groups, or paths) and of scheduling communication resources of relay communication devices and remote communication devices to quickly resolve congestion situations, to thereby resolve or prevent buffer overflows in relay communication devices.

As described above, a relay communication device (e.g. Relay UE) receives and collects one or more buffer capacity reports from a child remote communication device and sends these to an access device (e.g. eNB or gNB) using a buffer capacity report, possibly in combined form where multiple buffer capacity reports are integrated into a single reported buffer size report. It is noted that buffer capacity reports can be combined with other buffer capacity reports and/or with other buffer size reports (obtained from e.g. BSR MAC CEs). Such a combined form of buffer capacity report(s) with buffer size report(s) may then be called buffer status information report.

In various embodiments, it is further suggested having access devices schedule communication resources for transmission for all communication devices to obtain maximum efficiency of spectrum resource usage. This may support indirect network connections and thus scheduling for any indirectly connected remote or relay communication devices such that buffer overflows with resulting data loss do not occur.

Various embodiments provide a solution for optimal scheduling by access devices without frequent data losses in intermediate relay communication devices. The solution includes efficient gathering of the required information by access devices from communication devices (e.g. in a RAN) including e.g. buffer size reports, buffer capacity reports, scheduling requests, locally available buffer size information, or locally available buffer capacity information of communication devices, upon which the scheduling decisions can be based.

FIG. 1 schematically shows a network architecture with a buffer overflow issue in a relay communication device.

In the scenario shown in FIG. 1, a first communication device (e.g. UE1) 12-1 and a second communication device (e.g. UE2) 12-2 are acting as relay communication devices, wherein the second communication device 12-2, and further third and fourth communication devices (e.g. UE3, UE4) 10-2, 10-3 are themselves dependent on a parent relay communication device to establish their indirect network connection to an access device (e.g. gNB) 20 and to a core network 100. The core network 100 may comprise network functions such as a network slice selection function (NSSF), a user plane function (UPF) and an access and mobility management function (AMF). A fifth communication device (e.g. UE5) 10-1 is directly connected to the access device 20 and has no relay function in this scenario.

The second communication device 12-2 with relay function is receiving a sudden high upstream data volume via an SL connection from the remote fourth communication device 10-3, as indicated by the bold arrow indicating a first event E1. This high upstream data volume may have been triggered by an application server (app) 120 connected to the core network 100 and quickly fills up a buffer allocated by the second communication device 12-2 for upstream data of the fourth communication device 10-3.

It may thus happen that the second communication device 12-2 does not receive sufficient upstream communication resource allocations (for transmission towards the first communication device 12-1) to offload the buffered data, as indicated by the second event E2. Reasons for this situation may be that the access device 20 did not allocate sufficient upstream communication resources for the relay transfer between the first and second communication devices 12-1, 12-2 because due to temporary worse radio channel conditions there are insufficient communication resources available or because the access device 20 does not know that the second communication device 12-2 has a limited buffer capacity available to buffer the data (e.g. it may for example assume a 16 MB buffer capacity while the second communication device only has 128 KB allocated), or that the fourth communication device 10-3 used self-scheduled SL communication (i.e., not scheduled from the access device 20) to send the data to the second communication device 12-2 such that the access device 20 cannot control the amount of data transmitted to the second communication device 12-2, as indicated by the third event E3.

As an example, in 4G/5G ProSe and 3GPP V2X D2D communication, the latter case of self-scheduled SL communication is explicitly allowed for pre-authorized OoC communication devices that are not in direct connection to an access device (e.g. gNB). The sender then uses pre-configured or pre-announced frequency resource pools and performs self-scheduling within these pools.

The filling up of the buffer at the second communication device 12-2 will—regardless of whether the fourth communication device 10-3 uses self-scheduled resource allocation or its allocated communication resources are scheduled by the access device 20—lead eventually to buffer saturation and hence potential packet drops in the relay-type second communication device 12-2, followed by retransmissions from the fourth communication device 10-3, e.g., when PDCP acknowledgements are not received from the access device 20 (in case of an L2 relaying architecture) or the relay communication device 12-2 (in case of another relaying architecture in which PDCP acknowledgements are provided over one radio hop only).

For cases where the fourth communication device 10-3 is scheduled by its parent device (i.e. the second communication device 12-2) on behalf of the access device 20, the second communication device 12-2 can prevent buffer saturation by scheduling less communication resources for the fourth communication device 10-3. But this may cause important data to be not sent to the network in time, or less data to flow to the network than the fourth communication device 10-3 would need.

The ECN mechanism implemented in 4G/5G networks does not solve this problem. Because the second communication device 12-2 is the node experiencing the congestion, it should be the node that marks IP packets as "congested" using ECN bits in the IP header. However, the second communication device 12-2 does not necessarily see the IP packets that it relays because—depending on the relaying solution—it may relay PDCP packets without necessarily being aware of, or having access to, unencrypted contents of the PDCP service data unit (SDU) that contains the IP packets of the remote fourth communication device 10-3. Furthermore, the ECN mechanism in 4G/5G is developed for coarse grained voice/video codec rate selection and rate adaptation, e.g. for Voice over LTE (VoLTE) or IP Multimedia Subsystem (IMS) or Multimedia Telephony Service video sessions for e.g. mobile phones directly connected to a core network through a set of base stations and network functions, not for fine-grained resource control of transmission of short bursts of data and/or time critical or energy critical communication for IoT devices via relay devices.

A further complication may be that the allocated relay data buffer capacity on the second communication device 12-2 with the relay function may change dynamically due to network changes caused by the fact that one or more new relay communication devices and/or remote communication devices attach to the second communication device 12-2 or that one or more of the existing relay communication devices and/or remote communication devices (apart from the fourth communication device 10-3) start sending more data hence filling the respective buffer(s) faster, so that the available buffer capacity allocated for the fourth communication device 10-3 may shrink. Thus, if e.g. more remote communication devices are attached, the relay data buffer capacity per remote communication device is reduced. Or, if existing remote communication devices start sending more data, the maximum buffer capacity stays the same but the available buffer capacity is reduced. In both cases, the access device 20 should be notified about the change to improve overall scheduling.

Another complication is that a relay communication device may not know which remote communication device is the source of a high data load, for example because the source is more than one hop away from the relay communication device (e.g. via another relay communication device). This is relevant in case relay communication devices perform resource scheduling for their downstream relay and/or remote communication devices on behalf of the access device. In FIG. 1, such a situation may occur if the buffer of the relay-type first communication device 12-1 is almost full and it does not know that the fourth communication device 10-3 is the responsible source. In this case, it is difficult for e.g. the first communication device 12-1 to signal the source (e.g. fourth communication device 10-3) directly to send less data because the first communication device 12-1 does not know the origin of this data. The first communication device 12-1 could signal its downstream neighboring second communication device 12-2 that it is causing congestion, which then would let the second communication device 12-2 signal to the fourth communication device 10-3, but this ECN-like mechanism might lead to some data from the fourth communication device 10-3 not being sent into the network on time. This mechanism does not lead to adapting the network's scheduling on all the upstream links from the fourth communication device 10-3 onwards.

According to various embodiments, it is therefore proposed that the relay-type first communication device 12-1 directly connected to the access device 20 and acting as a relay communication device exchanging upstream/downstream data between a remote communication device (e.g. the third communication device 10-2) and the access device 20, when triggered by an event, provides buffer capacity information to the access device 20 about an available capacity of a data buffer residing in the first communication device 12-1 and/or an available capacity of a data buffer residing in the relay-type second communication device 12-2 and/or possible further relay-type communication devices (if present). The provided buffer capacity information can be formatted to be identifiable such that the access device 20 can relate a maximum-capacity information item to the specific communication device that initially reported this information item, wherein a scheduler at the access device 20 is configured to use the provided buffer capacity information to schedule communication resources for transmitting upstream or downstream data for the first communication device 12-1 and/or the second communication device 12-2 and/or any further relay-type communication device.

It is however noted that the provision of buffer capacity information is not necessarily achieved within the RAN only. It may as well be forwarded to the access device 20 via a detour, i.e., a relay communication device (e.g. the first communication device 12-1) may send the buffer capacity information to a network function in the core network 100 which may then provide the buffer capacity information back to the access device. Or, it may be forwarded to a downstream communication device, for example to a downstream remote communication device which uses the information to make an application-level decision about which relay communication device to use in the future i.e. for the process of relay reselection. Or, it may be forwarded to an OoC communication device, for example to a communication device that is discovering status information about prospective relay communication devices for the purpose of making an informed decision which relay communication to select for future indirect communication i.e. for the process of relay selection.

The buffer capacity information may be forwarded in an absolute form (e.g. "X bytes capacity available") or in a relative form (e.g. percentage X % of an available buffer capacity), based on which a receiver optionally derives information about an absolute number of bytes that can be buffered. However, the knowledge of e.g. "buffer is 80% full" may be enough to trigger mitigation actions (i.e. impact the scheduling) without necessarily knowing how much bytes of buffer space this 80% corresponds to, in particular, if the access device (or core network) manages one or more buffer capacities used in the relay communication device, or if the access device (or core network) has received information about a buffer capacity from the relay communication device as part of an earlier message, or if the percentage is relative to a pre-configured or known buffer capacity (e.g. pre-configured as part of a policy), or represented as an index into a table with values for different buffer capacity and buffer load related values.

In some alternatives, a compound value may be used to indicate a resource usage of the relay communication device. This value may be at least partly determined by a relay communication device's current buffer capacity and/or a past buffer capacity, for example a current buffer load percentage, an average buffer load percentage over a time window of the last 2000 ms, or the like. In another example, a compound value indicates a preference or the ability of the relay communication device for accepting an additional remote communication device. The compound value may be partly determined by the relay communication device's current buffer capacity, or by an average buffer capacity calculated over a time period, or alternatively by a worst-case buffer capacity measured over a time period. A particular example of the latter is a worst-case buffer load percentage measured over a time window of the past 2000 ms. The compound value could be encoded as for example an integer value in a predefined range (e.g. 0-3, or 0-100) or for example as a QoS identifier identifying the achievable quality of service under the present relay load encoded as for example a PQI or SQI identifier.

Figure 2:
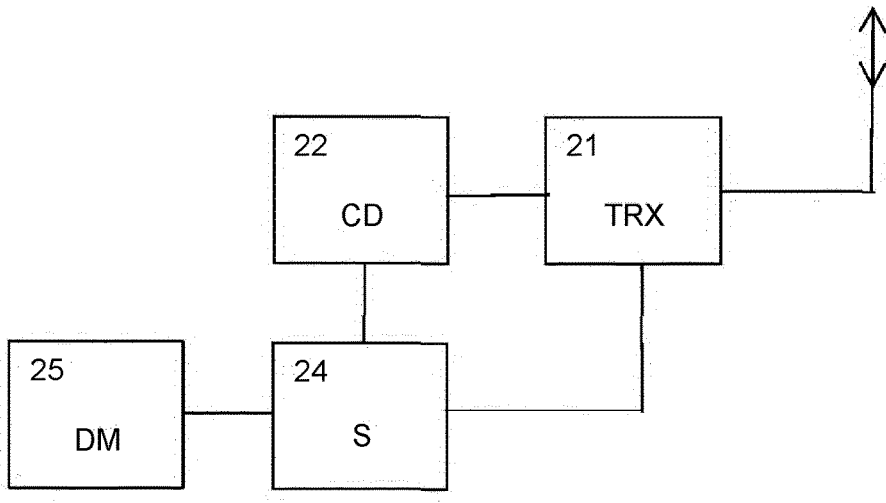
FIG. 2 schematically shows a block diagram of an access device according to various embodiments.

FIG. 2 schematically shows a block diagram of an access device according to various embodiments.

It is noted that only those blocks relevant for the proposed enhanced scheduling function are shown in FIG. 2. Other blocks have been omitted for reasons of brevity.

The access device of FIG. 2 may correspond to the access device (e.g. gNB) 20 of FIG. 1 or any other type of access device for any wireless network having a resource scheduling function.

According to FIG. 2, the access device comprises a transceiver unit (TRX) 21 for transmitting and receiving wireless messages and/or other wireless signals via an antenna. Messages with resource scheduling information or commands are generated by a scheduler (S) 24 based on derived buffer size and capacity information of directly and indirectly connected communication devices (including remote, relay or other communication devices) stored in a data memory (DM) 25 (e.g. database) connected to the scheduler 24.

Furthermore, the access device comprises a capacity information detector (CD) 22 which detects buffer capacity information contained e.g. in buffer capacity reports received from communication devices (e.g. relay UEs) via the transceiver unit 21.

Based on the capacity information obtained e.g. from buffer capacity reports, the scheduler 24 generates scheduling information for scheduled relay communication devices, which is forwarded via the transceiver unit 21 to the relay communication devices.

Thereby, an enhanced scheduling process can be provided, by which available buffer capacities of directly and indirectly connected relay communication devices are jointly considered.

Figure 3:
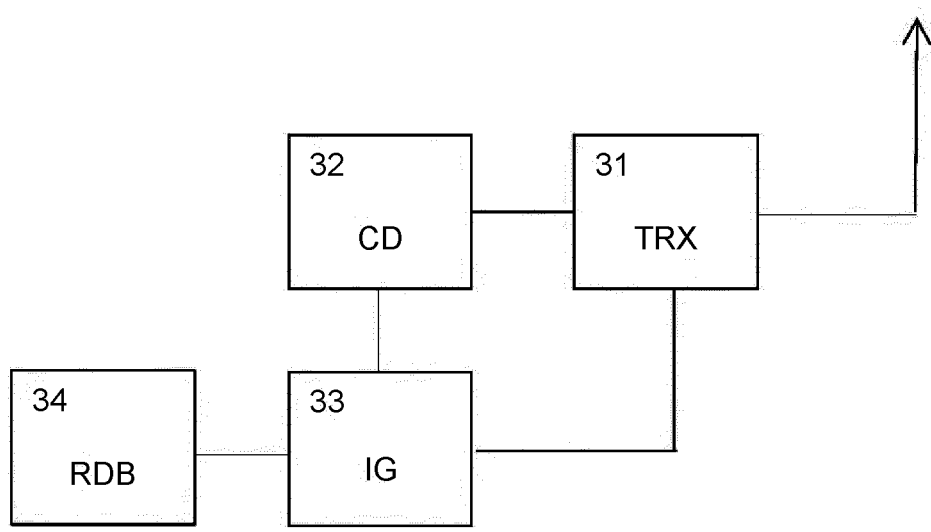
FIG. 3 schematically shows a block diagram of a communication device according to various embodiments.

FIG. 3 schematically shows a block diagram of a relay communication device (e.g. Relay UE) according to various embodiments.

It is noted that only those blocks relevant for the proposed enhanced scheduling function are shown in FIG. 3. Other blocks have been omitted for reasons of brevity.

The communication device of FIG. 23 may correspond to the first and second communication devices (e.g. UE1 and UE2) 12-1 and 12-2 of FIG. 1 or any other type of relay communication device for any wireless network having a resource scheduling function.

According to FIG. 3, the relay communication device comprises a transceiver unit (TRX) 31 for transmitting and receiving wireless messages and/or other wireless signals via an antenna. Messages with buffer capacity information (e.g. buffer capacity reports) are generated by a capacity information generator (IG) 33 based on a detected available buffer capacity of an own relay data buffer (RDB) 34 and possibly derived buffer capacity information of data buffer(s) of connected and/or neighboring relay communication devices.

Furthermore, the relay communication device comprises a capacity information detector (CD) 32 which detects buffer capacity information contained in buffer capacity reports received from the connected and/or neighboring communication devices (e.g. relay UEs) via the transceiver unit 31.

Based on the own capacity information and the capacity information obtained from buffer capacity reports of the connected and/or neighboring relay communication devices, the capacity information generator 33 generates (a) combined or enhanced buffer capacity report(s) which comprise buffer capacity information of the relay communication device and its neighboring and/or connected relay communication devices and which is/are forwarded via the transceiver unit 31 to the access device or to an upstream relay communication device in response to a trigger event described later. The forwarding may be directly or indirectly (e.g. over multiple hops, and/or via a network function). The upstream device may combine the buffer capacity report with an own buffer capacity report and send the combined report to the access device, or the upstream device may remove the buffer capacity information (e.g. if it makes a summary or a selection of buffer capacity reports).

Thereby, an enhanced scheduling process can be provided, by which available and/or relevant buffer capacities of directly and indirectly connected relay communication devices are jointly considered.

The individual blocks of the block diagrams of FIGS. 2 and 3 may be implemented by discrete hardware circuit(s) such as application specific integrated circuit(s) (ASIC(s)), programmable logic array(s) (PLA(s)), field programmable gate array(s) (FPGA(s)) or the like, or by digital signal processor(s) (DSP) or other software-controlled processor circuit(s).

Figure 4:
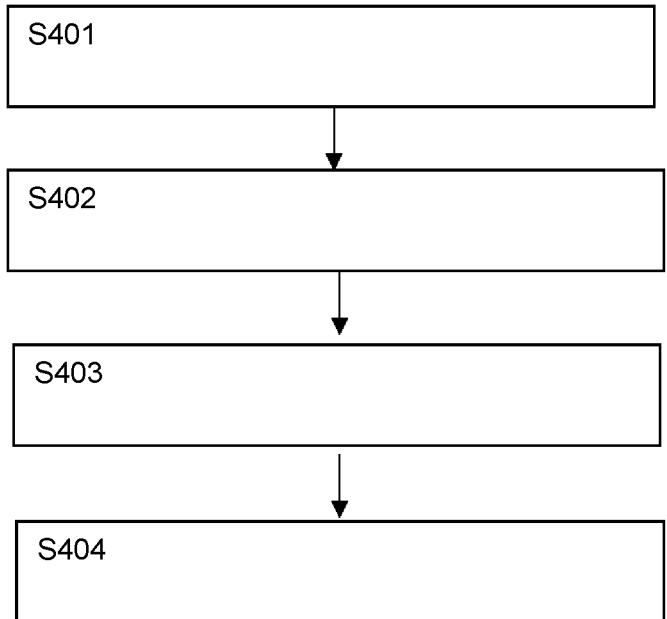
FIG. 4 schematically shows a flow diagram of a scheduling procedure according to various embodiments.

FIG. 4 schematically shows a flow diagram of a scheduling procedure according to various embodiments, which may be implemented at an access device (e.g. gNB or eNB or base station or access point) of a cellular or other wireless network.

In a first step S401, the access device receives and detects buffer capacity information of directly and indirectly connected relay communication devices in respective enhanced buffer capacity reports. Then, in step S402, the received buffer capacity information is allocated to the respective directly and/or indirectly connected relay communication devices. In step S403, communication resources are scheduled for communication devices at least partly based on the allocated buffer capacity information. Finally, in step S404, scheduled communication resources are signaled to the respective directly and/or indirectly connected communication devices.

Figure 5:
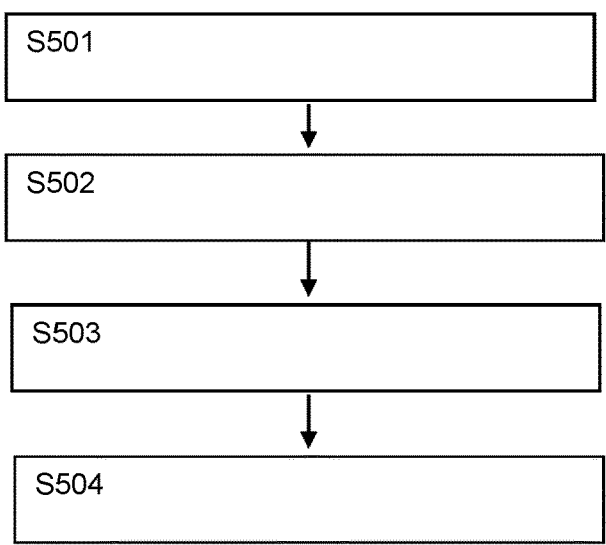
FIG. 5 schematically shows a flow diagram of a buffer capacity reporting procedure according to various embodiments.

FIG. 5 schematically shows a flow diagram of a buffer status information reporting procedure according to various embodiments.

The reporting procedure may be initiated by a trigger event occurring at a respective relay communication device, as described later. In a first step S501, the relay communication device determines an available capacity of its own relay data buffer. The determined capacity may be the capacity of a subset of the buffers, depending on circumstances and/or trigger events. Then, in step S502, available buffer capacity(s) of indirectly connected neighboring relay communication devices are determined and collected e.g. based on received buffer capacity reports. In step S503, a combined buffer capacity information of the own relay data buffer and/or directly and/or indirectly connected relay communication devices is generated, e.g., in a combined buffer capacity report. In some cases, not all buffer capacity information may be included (e.g. a relay communication device may include only buffer capacity information of itself and indirectly connected other relay communication devices). Furthermore, there may be cases where only the own relay data buffer capacity is reported in step S503 and not the information of any other neighbor device. Such cases may be for example when a relay communication device has no child relay communication devices or when child relay communication devices report buffer capacity information independently (e.g. via RRC, PDCP, IP etc.) to access devices and it is not combined by the relay communication device. A further case may be where a relay communication device leaves out its own buffer capacity information (even though it is determined) and only reports e.g. buffer capacity information of indirectly connected relay communication devices.

Finally, in step S504, the determined and/or collected buffer capacity information is reported to the access device and/or to an upstream relay communication device. The reported buffer capacity information may thus include at least one of the determined buffer capacity information of step S501 and the collected buffer capacity information of step S502.

It is noted that depending on trigger events and/or circumstances, the combined buffer capacity information may e.g. exclude one or more of the buffer capacity information of the own relay data buffer, the directly connected relay communication devices or the indirectly connected relay communication devices.

It is noted that the steps of the flow diagrams of FIGS. 4 and 5 may be implemented based on one or more software routines used for controlling a processor or computing unit provided in the access device or the relay communication device, respectively.

The buffer capacity information when reported by a relay communication device can be encoded in various ways. The enhanced buffer capacity report may comprise one or more maximum or available buffer capacity information items per report.

As a first option, multiple items can be reported for different logical channels present for upstream link(s) and/or downstream link(s) of relay communication devices, where maximum or available buffer capacity may be reported per logical channel.

As a second option, multiple items can be reported for different priority classes of buffered data present in relay communication devices, where maximum or available buffer capacity may be reported per priority class.

As a third option, multiple items can be reported for different downstream communication devices present for a relay communication device, where maximum or available buffer capacity may be reported per downstream communication device. For each downstream communication device, a separate buffer may be allocated within the relay communication device.

As a fourth option, buffer capacity reports received from one or more downstream relay communication devices may be combined with an own buffer capacity report and then reported as one combined buffer capacity report.

In case a relay communication device reports more than one available capacity information item, it could still be constrained to report less than all available capacity information items in a buffer capacity report, due to e.g. configuration settings from the access device (e.g. gNB) (e.g. indicating to temporarily report only a subset) or due to size constraints (e.g. there is only enough space in a current physical layer transport block to report less than all available capacity information elements (e.g. individual maximum buffer capacities)). Other capacity information items may be reported later (e.g. in a next physical layer transport block).

According to various embodiments, combined formats of the enhanced buffer capacity report may be provided, that include multiple items from the same relay communication device. These could also be combined within a single buffer capacity report with values from other relay communication devices, as described later.

As a first option, a relay communication device may report a binary payload in which there are N elements concatenated, each element corresponding to a buffer capacity information of e.g. one of its logical channels in order of increasing logical channel ID (LCID) number or logical channel group (LCG) number. In case the access device that receives the buffer capacity report stores for the relay communication device the LCID or LCG numbers in use, it can reconstruct the matching LCID or LCG numbers for each element, and thus a complete buffer capacity report can be provided with the advantage that the encoding can be efficient without a need to encode the LCID or LCG numbers.

As a second option, a relay communication device may include its buffer capacity report and/or an SL buffer size report (e.g. an SL BSR MAC CE) and/or an UL buffer size report (e.g. a BSR MAC CE) into a combined buffer status information report, together with buffer capacity information as specified by at least one of the other options.

As a third option, a relay communication device may summarize buffer capacity values, e.g. leaving out information reports for almost empty buffers, for more efficient or condensed reporting to its upstream parent or access device (e.g. gNB). Or, it may use two or more different formats for encoding multiple capacity information items, e.g. a compact format (e.g. 2 bit) for less important buffers and high-detail format (e.g. 8 bit) for more or most important relay data buffers.

As a fourth option, a relay communication device may report pairs of LCID or LCG numbers and related buffer capacity information.

As a fifth option, a relay communication device may report pairs of data priority class indicators and buffer capacity information.

As a sixth option, a relay communication device may select only relevant buffer capacity information items (e.g. leaving out buffer capacity information or reports for almost empty buffers) for more efficient or prioritized reporting to its upstream parent or access device, or it may select those buffer capacity reports with a high buffer load where urgent action by the access device and its scheduler is required (others are excluded).

As a seventh option, a relay communication device may report pairs of communication device identifier and buffer capacity information pertaining to buffered data to or from the identified (downstream) communication device. Or alternatively, it may report an ordered list of buffer capacity information elements where each element is reporting buffer capacity information for a set of one or more buffer(s) associated to a single downstream communication device only.

As already mentioned, the maximum or available buffer capacity could be reported either as an absolute value or a relative value. Reporting a relative value has the benefit that, together with information on the current buffer usage (i.e. current buffer size), the maximum or available buffer capacity can be deduced, and it allows the maximum or available buffer capacity also to dynamically change depending on circumstances without having to re-report an absolute maximum or available buffer capacity value along with buffer size report values. Compact reporting formats may also be favorable to limit signaling overhead.

According to various embodiments, information items within an enhanced buffer capacity report may be encoded as follows:

1. An n-bit category number may refer to a maximum capacity in bytes via a table lookup using for example buffer capacity indices (e.g. 8-bit length) to access a look-up table. These values are pre-agreed by standard.

2. An encoding of a current buffer load percentage (0-100%), which could be encoded e.g. as an 8-bit or 7-bit number encoding the integer percentage. This encoding may be useful when the access device can correlate it with a report, or earlier report, of buffer size information from the same communication device in order to estimate the absolute value of the maximum buffer capacity on the communication device.

3. An encoding of a current buffer load percentage (0-100%), approximating the true percentage, which could be encoded as a 6-bit, 5-bit, 4-bit, 3-bit or 2-bit number. This encoding may be useful when the access device can combine it with a report, or earlier report, of a buffer capacity information from the same communication device. As an option, a 2-bit encoding could map to categories <25%, <50%, <75% and >90%.

4. A highly compact 1-bit encoding (flag) that denotes "buffer usage threshold exceeded" when the bit is set to 1. The threshold could be an a-priori determined number like e.g. 80% threshold or it could be a threshold value agreed with earlier (setup) communication between the reporting communication device and the access device (e.g. RRC protocol communication). Such threshold may be defined relative to a maximum memory allocation of the UE, maximum memory available for Sidelink buffers or uplink buffers, a maximum capacity of a particular buffer, (average) buffer load or the current capacity of a particular buffer.

5. An encoding as an n-bit number like in the above option 3, where each value denotes a particular threshold of buffer load that is pre-agreed in communication between the access device and the reporting communication device. For example, the access device might push a lookup table that links each value to a buffer-full-percentage to the communication device in a setup (RRC) communication.

6. Meta information about the buffer can be reported, like a single bit ("stable bit") to indicate if the allocated buffer is guaranteed to be at least its current capacity (e.g. "1") or not guaranteed (e.g. "0") to stay at this capacity, or a single bit to indicate if the allocated buffer needs to shrink (e.g. "1") or not (e.g. "0") due to any reason (e.g. reconfiguration of relay and/or remote communication devices in the network, or an application in a relay communication device needing more memory). The meta information can be encoded with more bits to encode a reason for buffer shrinking or a time duration for which the current buffer capacity allocation is guaranteed in the relay communication device.

7. The reported information could include specific requests towards the access device caused by buffer-related issues, such as an "alert" field or bit to indicate to the access device that the relay communication device would like to off-load one or more remote communication devices to another relay communication device, due to communication resources getting scarce on the relay communication device itself, or a "capacity" field to indicate to the access device how much buffer space is available for any future relay or remote communication device if they would be added to the current relay communication device as children. This may improve the access device's allocation of relay or remote communication devices to parent relay communication devices through network topology reconfigurations, when the relaying architecture used in the wireless network supports such reconfigurations.

According to various embodiments, reporting of the buffer capacity information to the access device and/or to another communication device in the wireless network may be achieved by the following options:

1. A transport protocol on top of the Internet Protocol (IP) may be used, such as Hypertext Transfer Protocol (HTTP), Constrained Application Protocol (CoAP), Transmission Control Protocol (TCP), User Datagram Protocol (UDP), Message Queuing Telemetry Transport (MQTT) or others. The IP packet(s) carrying the transport protocol PDU(s) with the buffer capacity information may be relayed to the access device in case the reporting relay communication device is not in direct connection with the access device. Once the IP packet(s) arrives at the access device, it is forwarded to the network function (NF) indicated by the IP destination address. If the NF is external to the access device, the NF may after receiving a buffer capacity report in turn notify the access device of the reported buffer capacity information such that the access device can use this for scheduling according to various embodiments. Otherwise, if the NF is internal i.e. located at the access device, it receives and uses the reported buffer capacity information directly.

2. The RRC protocol may be used, end-to-end relayed between relay communication device and access device in case of an L2 relaying architecture, or over a single wireless link between a relay communication device and another relay or remote communication device, for example in case of an L3 relaying architecture, or to report directly to a peer communication device over the PC5 interface over SL. RRC messages are in turn transported over PDCP over Radio Link Control (RLC) over MAC protocol over potentially multiple hops. This option has the benefit that reliability of transport is guaranteed (via PDCP, using retransmissions) and integrity protection is applied. Note that aforementioned RRC over a single link sent device-to-device is referred to as PC5-RRC.

3. PDCP control or data PDUs may be used.

4. MAC control elements (CE) may be used, which are sent to the next upstream relay communication device over SL, or to a peer communication device over SL, or directly to the access device over UL. This is a lightweight method, where in some cases it is even possible to opportunistically make use of unused space in a transport block, e.g., as achieved by Padding BSR MAC CEs.

5. An uplink control information (UCI) data format may be used, which is sent by a relay communication device directly to the access device over UL channels (e.g. via a physical uplink control channel (PUCCH) or a physical uplink shared channel (PUSCH)).

6. Within a sidelink control information (SCI) data format, which may be sent by a relay communication device to another relay or remote communication device over an SL connection.

7. A PC5 message over SL may be used, for example a relay discovery message, relay announce message, relay discovery response message, or PC5-RRC message. This has the benefits that it may enable reporting to communication devices with which the sender does not yet have an established PC5 link, and that it may enable reporting to multiple devices simultaneously using a broadcast message.

8. A combination of the above options by e.g. reporting directly to the access device via RRC and also via MAC CE to a direct upstream parent relay communication device. Or, e.g. via MAC CE to a parent relay communication device which then collects one or more reports from child relay communication device(s) and sends these using RRC directly to the access device.

According to various embodiments, a PDCP control PDU may be used for sending buffer capacity information to the access device. According to 3GPP specification TR 38.323 v15.6.0, section 6.3.8, types 010-111 of the control PDUs are still available for additional extensions and can therefore be used for signaling buffer capacity information.

The new PDU type could use any format, e.g. a single value reported by a relay communication device to an upstream parent relay communication device or to the access device directly, or a buffer capacity report that combines multiple values can be reported to the upstream parent relay communication device or to the access device directly. The report may be composed of an own buffer capacity report by the relay communication device, plus information from aggregated buffer capacity reports received from downstream relay communication devices, or the buffer capacity report can be combined with previously reported buffer size information (e.g. information from BSR MAC CEs or SL BSR MAC CEs) of downstream (relay) communication devices.

This PDCP-based approach is advantageous in that it provides low overhead and is—in an L2 relaying architecture—end-to-end transmitted from the relay communication device to the access device. The PDCP control PDU can be interleaved with regular PDCP data PDUs on existing radio bearers.

As indicated in the procedure of FIG. 5, the proposed buffer capacity reporting may be triggered by an event (e.g. rule or instruction) that happens at the relay communication device. Examples of such events may be:

1. A maximum buffer capacity on a relay communication device has changed to a lower capacity;

2. a data relay buffer has filled up above a defined threshold wherein the threshold could be absolute (e.g. measured in bytes) or relative (e.g. a percentage of total buffer capacity available for that specific buffer, or a percentage of total buffer memory available in a communication device);

3. a timer-based trigger;

4. a load of the relay data buffer has increased by at least N % with respect to the previous reported load;

5. a receipt of a buffer capacity query from the scheduling access device or an upstream relay communication device;

6. a change of a buffer capacity on a remote communication device;

7. a receipt of a buffer size or capacity report from a downstream remote or relay communication device;

8. a receipt of a buffer status message (e.g. SL-BSR MAC CE), scheduling request message, or query message (e.g. a Recommended Bit Rate query MAC CE, or a relay status query message, or a relay discovery message) from a downstream remote or relay communication device;

9. a receipt of a recommended bit rate message (e.g. Recommended Bit Rate MAC CE) or query message (e.g. Recommended Bit Rate query MAC CE) from a downstream remote or relay communication device; and 10. a receipt of a communication resource request message from a downstream remote or relay communication device. For example, a relay discovery request message broadcasted by a remote communication device with the intention of discovering a potentially better suitable parent relay communication device than its current one. 11. a receipt of a communication resource request message or a query message from an OoC communication device. For example, a relay discovery request message broadcasted by an OoC communication device with the intention of discovering a suitable relay communication device.

In case not every relay communication device (e.g. Relay UE) reports its own buffer capacity information directly and independently to the access device (e.g. gNB), a format for combined reporting of multiple relay communication device's information to the access device may be used. Combined buffer capacity reporting may be advantageous due to a reduced signaling overhead and thus more efficient communication resource usage. Another potentially advantageous feature is that an upstream relay communication device may get insight into buffer capacity reports of its downstream relay communication devices and is thus enabled to regulate data traffic better or to increase its own buffer allocation for certain data streams to help a downstream relay communication device that experiences a high buffer load.

Examples of various options for combined formats may be:

1. A relay communication device reports a binary payload in which there are N+1 elements concatenated, starting with its own buffer capacity report as a first element. The remaining N elements may then be buffer capacity reports of its downstream relay commission devices (children) in order of increasing ID number, wherein the ID number can be any relevant identity like a radio network temporary identifier (RNTI), or ProSe UE ID, or ProSe Relay UE ID, or other.

2. The relay communication device combines buffer capacity reports of downstream relay communication devices into a combined buffer capacity report by concatenation.

3. The relay communication device summarizes buffer capacity reports received from downstream relay communication devices for more efficient reporting to its upstream parent or access device. E.g., the format may be condensed from an original 8-bit buffer load (%) value into a 2-bit value (e.g. <25%, <50%, <75%, >90%). The individually attributable reports may still be kept, for example reporter identity may be encoded implicitly in the order of sending the 2-bit elements.

4. The relay communication devices may report pairs of ID and buffer capacity report of individual relay communication devices, wherein the ID may be one of those IDs defined in the above option 1. As an alternative, a short ID could be defined to increase efficiency, e.g. a 4-bit or 8-bit index that the access device can translate to a true identity of the reporting relay communication device.

5. The relay communication devices may select only relevant reports, e.g., those with a high buffer load where urgent action by the scheduler of the access device is required.

In one embodiment, the access device (e.g. gNB) may decide based on received buffer capacity reports that a relay or remote communication device (e.g. UE) may need an additional parent relay communication device on top of its current one, since a buffer in that relay communication device or in one of its upstream parent relay communication devices may fill up too quickly or overflow. To achieve this, the access device may instruct a specific relay or remote communication device to acquire an additional parent or initiate a replacement of a parent.

Figure 6:
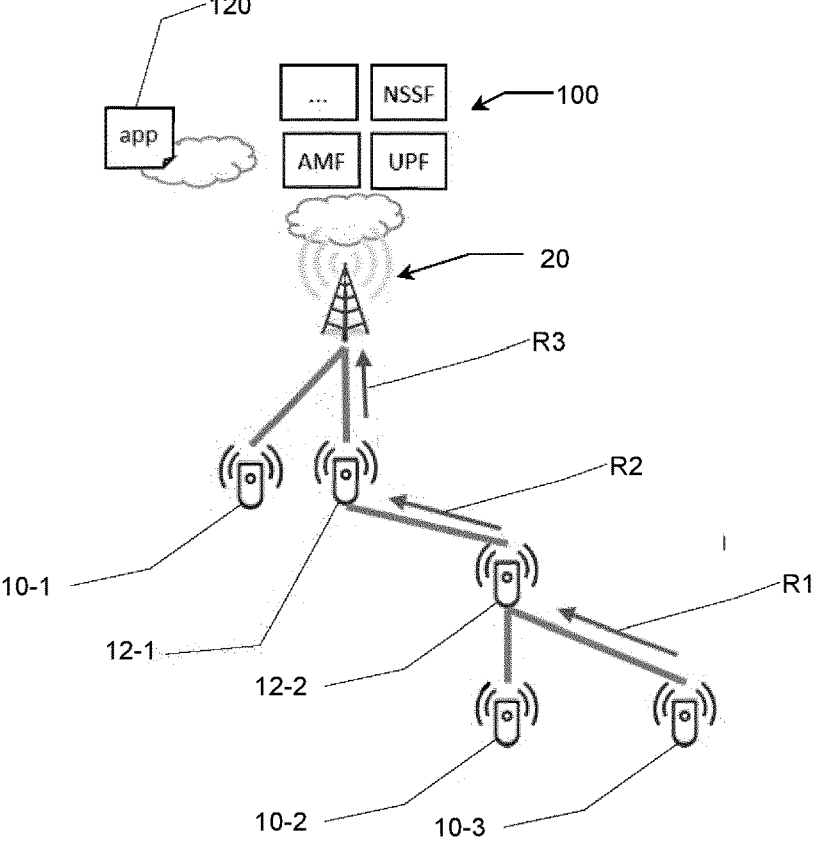
FIG. 6 schematically shows a network architecture where buffer capacity information is collected via relay communication devices according to various embodiments.

FIG. 6 schematically shows a network architecture where e.g. MAC CEs are used to collect buffer capacity information via relay communication devices according to various embodiments. The components of the network architecture of FIG. 6 corresponds to that of FIG. 1, so that components with same reference signs are not described again here.

The access device 20 schedules communication resources based on received buffer size and capacity information.

In the scenario shown in FIG. 6, the remote fourth communication device 10-3 suddenly produces a large data volume and sends part of this data to its parent, i.e. the second relay-type second communication device 12-2, along with a MAC CE type similar to SL BSR MAC CE to indicate remaining data to the parent (arrow R1). It is noted that this MAC CE could as well be identical to an SL BSR MAC CE for this embodiment.

The new data fills up the relay buffer in the second communication device 12-2 above a predefined threshold, which corresponds to an event to trigger the second communication device 12-2 to report its buffer capacity information to the upstream relay-type first communication device 12-1, as indicated by an arrow R2. It may do this by forwarding a separate new MAC CE element "MaxSize" indicating its maximum buffer capacity and also a SL BSR MAC CE or equivalent new MAC CE type indicating its current relay buffer size(s).

The first communication device 12-1 receives the MaxSize MAC CE and the BSR MAC CE and in turn reports a MaxSize information for itself and for the second communication device 12-2 towards the access device 20, as indicated by arrow R3. It also adds an extended BSR MAC CE including buffer capacities of itself and of the second communication device 12-2. The term "extended" is used here to express that the existing BSR MAC CE cannot contain buffer sizes of other devices. Thus, an extended MAC CE is proposed that may be similar to the existing one but enables storing data of other devices as well.

Then, the scheduler of the access device 20 determines that more bandwidth is needed in the path from the remote fourth communication device 10-3 to the access network and starts sending messages with resource scheduling information to allocate more communication resources, as described below in connection with FIG. 7.

Figure 7:
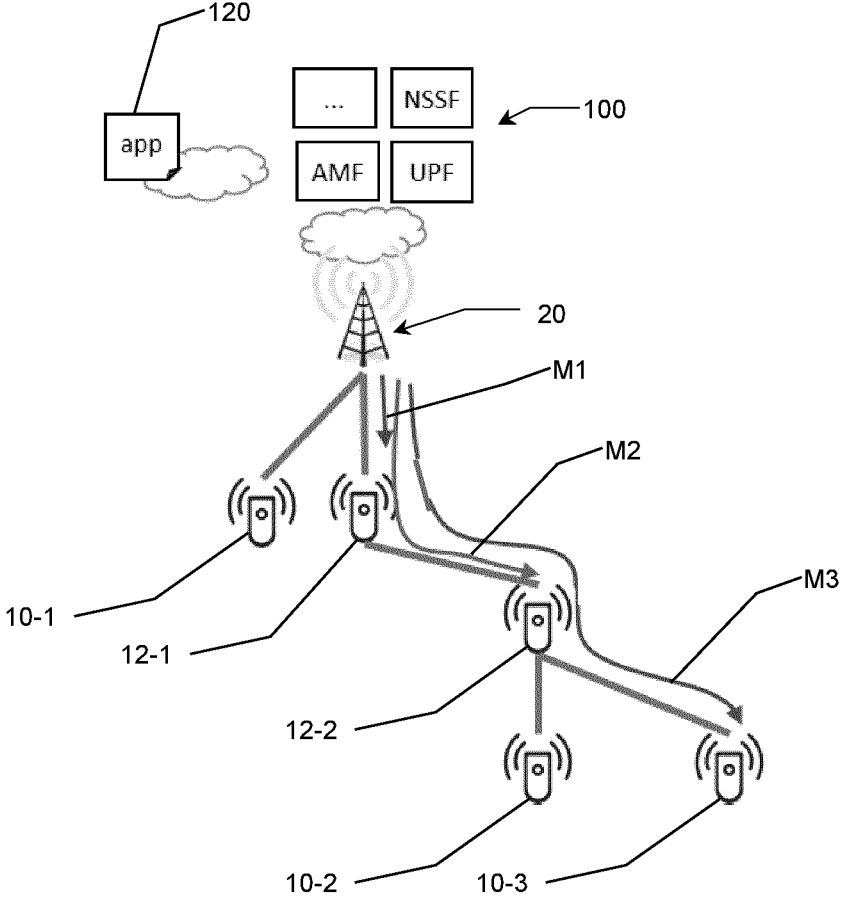
FIG. 7 schematically shows a network architecture where scheduling information is distributed via relay communication devices according to various embodiments.

FIG. 7 schematically shows a network architecture where e.g. DL control information (DCI) and RRC messages are used to distribute scheduling information via relay communication devices according to various embodiments. The components of the network architecture of FIG. 7 corresponds to that of FIG. 1, so that components with same reference signs are not described again here.

In the scenario of FIG. 7, a DCI is sent e.g. over a PDCCH that includes dynamic UL and/or DL and/or SL schedules for the relay-type first communication device 12-1 only, as indicated by an arrow M1. This may not be sent once but whenever the first communication device 12-1 is granted (additional) communication resources for DL or UL data transfer. Thus, it may be sent multiple times during the scheduling process.

Then, a first RRC message is sent (e.g. over PDCP), that includes an SL schedule update for the relay-type second communication device 12-2, as indicated by the arrow M2.

Finally, a second RRC message is sent (e.g. over PDCP), that includes an SL schedule update for the remote fourth communication device 10-3, as indicated by the arrow M3.

It is noted that the transmission sequence of the first and second RRC messages may be changed. It may be a default sequence or it may be set in advance.

The above second RRC message may be optional if the resource allocation of the fourth communication device 10-3 does not need to be updated.

Now using the new resource allocation, the second communication device 12-2 can transmit more data to the first communication device 12-1, and the first communication device 12-1 can transmit more data in UL direction to the access device 20, so that the percentage of relay data buffer usage of the second communication device 12.2 decreases.

In various embodiments, the access device 20 can control and thus influence the maximum or available buffer capacity of a relay communication device. It does this in response to one or more previously received buffer capacity reports. The buffer capacity control may be achieved by at least one of the following options:

1) Command a relay communication device to increase or decrease the buffer capacity for a specific LCID, or specific LCG, or a specific downstream child relay or remote communication device, or for data streams associated to a specific network slice;

2) switch a relay communication device between an "autonomous mode" of buffer allocation (done by the relay communication device itself) and a "directed mode" of buffer allocation (where the access device 20 determines the buffer capacities via control commands);

3) set a policy in a relay communication device on how buffer allocation should be done, wherein the policy may include the determination of data buffer capacities in the relay communication device;

4) set a reporting granularity of reports generated by a relay communication device, e.g. switch from low accuracy buffer capacity values to high accuracy buffer capacity values or vice versa, or increase the time interval between reports, or request higher level reporting (less detailed) or vice versa; and 5) command a relay communication device to merge multiple separate buffers into one buffer allocation, e.g., create a shared buffer for all upstream relay data traffic instead of keeping N separate buffers for N LCIDs or M separate buffers for M downstream communication devices.

In another embodiment which can be combined with any of the other embodiments of the invention or implemented independently of the aspects of this invention, low-latency reporting using scheduling request timing may be provided in case a relay communication device is the last relay communication device before the access device 20 and is directly connected. This reduces latency between an event of new data becoming available on some communication device and the access device 20 receiving the data in a case where no existing UL communication resources are yet granted for the last-hop relay communication device to transmit application data and/or buffer size information (e.g. BSR MAC CEs) and/or buffer capacity information.

To achieve this, multiple PUCCH scheduling request (SR) configurations may be used in the last-hop relay communication device. These can be configured by the access device 20 and may comprise at least a first PUCCH SR configuration for low-latency data (including relayed low-latency data) and a second PUCCH SR configuration for non-low-latency data. A PUCCH scheduling request configuration is used to perform a scheduling request (SR) procedure on PUCCH to request for resources for uplink shared channel (UL-SCH) transmission as defined in 3GPP specifications TS 38.300 v16.4.0 and TS 38.321 v16.3.0. Each configuration may consist of a set of PUCCH resources across different bandwidth parts and cells. Each logical channel on the relay communication device may be mapped to a particular SR configuration, by RRC configuration as defined in TS 38.331 v16.3.1. One RRC configuration information element (IE) is SchedulingRequestConfig which may contain a sequence of SchedulingRequestToAddMod elements which configure parameters for the specific SR configuration to be added, including sr-ProhibitTimer and sr-TransMax which respectively control the retransmission timer and maximum number of repeated transmissions of an SR. Another RRC configuration IE is SchedulingRequestResourceConfig which defines a particular time/frequency resource configuration for SR. This includes a field periodicityAndOffset that defines how often an SR opportunity occurs and also where it occurs, for example every slot (sl1) or every eight slots (sl8). Another RRC configuration IE is SchedulingRequestResourceConfig-v1610 which defines a priority choice (p0=low, or p1=high) for a particular SchedulingRequestResourceConfig. Thus, an SR configuration associated to a logical channel for low-latency data may for example use an SR opportunity every slot (sl1) with high priority (p1). And an SR configuration associated to a logical channel for non-low-latency data may for example use an SR opportunity every $8^{th}$ slot (sl8) and low priority (p0).

Furthermore, an access device is able to influence a cyclic shift and an orthogonal cover sequence, and whether or not a UE should perform frequency hopping. By providing different scheduling request configurations and different PUCCH resources, an access device may be able to identify scheduling requests from each connected UE individually, or even per logical channel ID.

The relay communication device may transmit an SR signal using the first PUCCH SR configuration in case it has low-latency upstream relay data to transmit towards the access device 20, or in case it is triggered to transmit buffer size information (e.g. using a BSR MAC CE) towards the access device 20 related to buffered low-latency upstream relay data, or in case it is triggered to transmit buffer capacity indication data to the access device 20, related to buffered low-latency data.

As a result of receiving the scheduling request, the access device may allocate uplink resources for the relay communication device to transmit the buffered low-latency data. Using the uplink resources allocated by the access device 20 the relay communication device transmits the buffered low-latency relay data (if any) to the access device 20 as well as buffer capacity information (which may be sent later in case delivery of the low-latency data itself is deemed more important).

It is to be noted that this principle could actually be applied to any UE sending low-latency data, and is not limited to relay communication devices.

Thus, in accordance with a first aspect of this embodiment, it is proposed a method for requesting communication resources in a network, the method comprising at a relay communication device, selecting a scheduling request (SR) configuration out of a set of scheduling request configurations, depending on a type of data to be sent, the relay communication device transmitting a scheduling request signal using the selected scheduling request configuration, the relay communication device using communication resources allocated by an access device in response to the transmitted selected scheduling request to transmit at least buffer capacity information to the access device.

Further, in accordance with a second aspect of this embodiment, it is proposed a relay communication device for requesting communication resources in a network, the relay communication device comprising a controller adapted to select a scheduling request (SR) configuration out of a set of scheduling request configurations, depending on a type of data to be sent, a transmitter adapted to transmit a scheduling request signal using the selected scheduling request configuration, the transmitter being configured for using communication resources allocated by an access device in response to the transmitted selected scheduling request to transmit at least buffer capacity information to the access device.

In an option of this embodiment, the set of scheduling request configurations comprises at least a first scheduling request configuration for low-latency data (including e.g. relayed low-latency data) and a second scheduling request configuration for non-low-latency data.

In another option of this embodiment, the scheduling request is triggered in response to any one of the following events: the relay communication device has low-latency upstream relay data to transmit towards the access device, buffer capacity information is triggered to transmit towards the access device related to buffered low-latency upstream relay data, or buffer capacity information is triggered to transmit to the access device related to buffered low-latency data.

A benefit of using such a low-latency specific SR configuration is that the SR will directly indicate to the scheduler of the access device 20 that low-latency data is pending at the relay communication device for one of its downstream communication devices, such that the scheduler will schedule radio resources for UL at the first possible occasion and/or with higher priority, which improves scheduling to achieve lower latency.

However, the access device may not know how much low-latency data is buffered by the relay communication device. According to TS 38.321 the uplink resources would also be used to send a buffer status report (BSR) message to the access device, if the uplink resources are not sufficient. However, in case of low-latency relay data or low-latency data in general for a UE, it may be beneficial to use all the uplink resources for transmitting the low-latency data. But if this is done, the access device would not be able to distinguish the case when the scheduled UL resources are exactly sufficient, almost sufficient (leaving no room for BSR message), or not sufficient to transmit the buffered data. To this end, one option could be that the access device in case of low-latency data for the access device, if all uplink resources (or almost all, i.e. above a certain threshold) within a certain time interval are used for transmitting the buffered low-latency data (i.e. does not contain any other content or messages, such as a BSR), to assume that the uplink resources are not sufficient and immediately schedule additional uplink resources. This assumes that the access device would be able to determine based on the scheduling request that was received that the uplink resources were used for transmitting data from a buffer containing low-latency data, e.g. by identifying that the scheduling request is related to a logical channel being used for transferring low-latency data. The disadvantage of doing so is that too many resources may be scheduled which are not needed by the UE. Also, the UE, if all buffered low-latency data was already transmitted, may also use the additional uplink resources for less urgent data. So if the uplink resources were just enough, the access device may not be able to distinguish this case. Therefore, in one embodiment which can be combined with any of the other embodiments of the invention or implemented independently of the aspects of this invention, the UE includes a special signal (e.g. by adding a flag or setting a bit in the header of a transmitted message to the access device or appended at the end of all transmitted messages) to indicate that more data is pending and/or a BSR is pending for transmission. If information about buffer capacity is available or managed by the access device, or has been signalled by a previous buffer capacity report, then yet another option could be that a buffer load percentage, buffer capacity index or flag indicating whether a buffer load threshold has been exceeded or not, is sent to the access device using scheduled uplink resources, which may reflect the buffer size (i.e. the amount of data remaining in the buffer) after the buffered data is transmitted to the access device. Alternatively, the UE could send a copy of the previously sent scheduling request or a new scheduling request related to the low-latency data as part of the scheduled uplink resources, or immediately after the last transmitted message or the first PUCCH opportunity (if this comes before receiving additional uplink resources). The benefit is that all these signals are typically smaller than a BSR message (e.g. the logical channel ID or logical channel group ID information does not need to be included if a separate buffer for low latency data is used). This is useful to maximize the resources to be used for transmitting the low latency buffered data, and also for example in cases where the uplink resources are insufficient for transmitting a BSR together with all buffered low-latency data.

It is to be noted that this principle could be applied to any UE sending low-latency data, and is not limited to relay communication devices.

Thus, in accordance with a first aspect of this embodiment, it is proposed a method for requesting communication resources in a network, the method comprising the mobile device using communication resources allocated by an access device for a given time interval, to transmit buffered data of the given type, and if the allocated communication resources within a time interval are not sufficient to send all buffered data of the given type to transmit as part of the same allocated resources a buffer capacity report, buffer load percentage, buffer capacity index or flag indicating whether a buffer load threshold has been exceeded, or a flag indicating that more data of the given type is in the mobile device's buffer, instead of a BSR. In one option, the mobile device reserves the amount of bits needed to send the buffer capacity report, buffer load percentage, buffer capacity index or flag, for this purpose from the allocated resources, and sends this information immediately before ("prepended") the buffered data of the given type, or immediately after ("appended") the buffered data of the given type. The number of bits needed for this can be pre-agreed/pre-configured by the mobile device and the access device, so all other bits can be used for sending the buffered data of the given type. In another option, the buffer capacity report, buffer load percentage, buffer capacity index or flag is sent as part of or instead of a header (e.g. MAC (sub-)header) of a data frame (e.g. instead of LCID or using the reserved flag R).

In another option, the relay communication device may maintain a separate buffer for low-latency data, and one or more other buffers (e.g. for streaming data which may be separately buffered as lossless and lossy streaming data, bulk data, and delay-insensitive data). To this end the relay communication device may receive information about the type of data to be relayed from the remote communication device or the access device (which may for example be in the form of QoS data, such as 5QI value or logical channel configuration or maximum latency value, or a flag/attribute value set during connection setup, or configuration included in an RRC message, or information in a header of a frame/packet). Each of these buffers may be assigned with a different identifier, which may be a buffer identifier or an identifier related to a logical channel/radio bearer (e.g. Logical Channel ID or LCID) or a logical channel group (LCG). These identifiers may be assigned by the relay communication device and may be transmitted to the access device, or these identifiers may be assigned by the access device and may be transmitted to the relay communication device. The access device may use such identifiers to define and/or map these to scheduling request configurations, and communicate the mapping of these identifiers to particular scheduling request configurations to the relay communication device. Using a single separate buffer which aggregates all low-latency data, independently from which remote communication device or relay communication device it originates from, simplifies the configuration that would be needed to uniquely identify a scheduling request for low-latency data, in particular if only a single other buffer is used for all other (i.e. non-low-latency) data or messages. The access device may further define separate scheduling request configurations for different buffer sizes or buffer load thresholds (e.g. a first scheduling request configuration to be used if the buffer load percentage is less than 90% and a second configuration to be used if the buffer load percentage is at least 90%). This information may be sent as policy information by the Policy Control Function (PCF) or through RRC.

If a separate buffer is used for low latency data, and the resource allocation is prioritized to transmit the data in the low latency buffer, then the LCID may be omitted from the MAC layer headers. Using the mechanism described above to use all resources for transmitting the buffered data of a given type (in this case low latency data), using buffer capacity report, buffer load percentage, buffer capacity index or flag to indicate that the allocated resources are not sufficient, then the mobile device may omit the LCID from the MAC layer headers until the low latency buffer is empty (or below a threshold). If in addition the length of the data payload frames (e.g. MAC PDU/SDU) to be used is known by both the mobile device and access device (e.g. through pre-configuration), the entire MAC header (incl. its length fields and format) may be omitted. The mobile device may be pre-configured to always switch to a mode in which buffered low latency data is sent first and LCID information is omitted from the MAC layer headers, or the mobile device may be pre-configured with a policy to do this may depend on a buffer load threshold for a low latency buffer. Alternatively, the access device may indicate using a flag that the scheduled resources are to be used for transmitting low latency data.

Once the low latency data buffer is empty or below a threshold, the buffer capacity report, buffer load percentage, buffer capacity index or flag is given a value that can be recognized by the access device as an indication that the mobile device will switch back to operation mode whereby the LCID information will be included again in the MAC layer headers. As another option, a buffer status report should be sent to indicate to the access device that the mobile device switches back to operation mode whereby LCID information will be included in the MAC layer headers, and indicate that some other buffers (allocated to other LCIDs) may have pending buffered data for which uplink resources need to be scheduled.

In another option, the relay communication devices may determine a combined buffer status information of all intermediate hops (i.e. other relay communication devices) between the remote communication device and the relay communication devices, whereby the combined buffer status information may include buffer size information and may include buffer capacity information such as buffer size limit(s), buffer load level of each buffer separately, or e.g. per type of data to be relayed (e.g. combine all the buffer status information of the low-latency buffers used by the intermediate relay communication devices or latency-related information, such as the average time the data stays inside a buffer of a relay communication device). To this end, each relay communication device may transmit not only its own buffer capacity information, but also the buffer capacity information received from an intermediate node or remote communication device. Alternatively, a relay communication device may send a message to another (downstream) relay communication device over PC5 (e.g. an RRC message destined to a particular relay communication device and hence potentially relayed via one or more downstream relay communication devices) to request buffer capacity information of that another (downstream) relay communication device. After gathering, aggregating, and encoding the received buffer capacity information of downstream devices, possibly together with its own buffer capacity information, the relay communication device may send this combined buffer status information to the access device. By providing this information to the access device, the access device may use this to schedule additional Sidelink resources, change the timing of scheduled resources to better align the communication between intermediate nodes, and may provide instructions on how the relay communication devices should use these resources for prioritized transmission of the low-latency data (e.g. by providing the respective LCID, LCG, buffer identifier or remote communication device identifier which should be given higher priority in time or for which the data always needs to be transmitted first before any other information is transmitted, such as buffer status reports).

Based on the received combined buffer status information, the access device may be able to determine a bottleneck in one of the intermediate relay communication devices used for relaying the data for a remote UE, and may provide/schedule additional Sidelink resources to one or more intermediate relay communication devices, or may instruct a buffer capacity of one or more intermediate relay communication devices to be increased. A relay communication device may also be able, based on received buffer capacity information, to decide to use additional resources or increase its buffer capacity, e.g. based on a pre-configured policy (e.g. received from the access device or from PCF). Alternatively, it may use additional Sidelink resources in unlicensed bands. A relay communication device and/or a remote UE may also be configured with a resource pool for transfer of low-latency data over sidelink which is separate from resource pool(s) used for transfer of other (i.e. non-low latency) data. Such separate resource pool may use higher frequencies, larger bandwidths, carrier aggregation, shorter time intervals, in order to be able to perform faster data transfer. Such resource pool may be configured for a single remote UE (or very small number of remote UEs) to enable the remote UE to send its data without having to sense the medium before transmitting over sidelink, and hence reduce the delays. To this end, if low latency QoS is requested for a remote UE, the access device authorizes and configures a separate resource pool for sidelink communication e.g. through an RRC message to the relay communication device and/or remote UE (either directly or via the relay communication device). It may also configure an identity of the remote UE and a set of credentials to be used (as part of the communication connection setup over sidelink) to allow the relay communication device to identify if the remote UE is authorized to use this separate resource pool. The relay communication device may inform the remote UE about the separate resource pool for low latency communication during relay discovery, or sidelink connection setup, or through RRC or other messages after sidelink connection has been established.

In another option, based on received buffer capacity information (e.g. if maximum buffer capacity is being reached or if remaining memory capacity is insufficient to add an additional remote communication device or relay communication device), the access device may send a message to a relay communication device to stop making itself discoverable as a relay. Also, the criteria for doing so may be transmitted (e.g. (pre-) configured through a policy sent by the access device or by PCF) to a relay communication device, so that it can make this decision without having to consult or receive an additional message from the access device. Similarly, if the access device (or relay communication device based on a policy) determines that the latency induced by a particular relay communication device exceeds a threshold (e.g. based on the average time the relayed data stays inside a buffer), the relay communication device may be instructed to stop making itself discoverable, or the remote communication device may be instructed to select another relay communication device to transport its data to the access device or core network. To this end, the relay communication device may report the average latency induced by a relay communication device via PC5 discovery messages, or via an RRC message. This latency information may be reported per relay communication device or per LCID or per LCG or per buffer ID. A relay communication device may also receive information from other relay communication devices (or indirectly from an access device) about the average end-to-end latency for sending a message to the access device via one or more relay communication devices, and may send information about the end-to-end latency in PC5 discovery messages and/or an RRC message to a remote communication device or other relay communication device.

In a sub-embodiment, low-latency reporting using SR timing for one particular remote communication device or a particular downstream logical channel ID or buffer ID used for PC5 communication between a remote communication device and a relay communication device (which may be different than the LCID used on the Uu interface) may be provided as a special case of the above embodiment. In case of relaying data for one or more remote communication devices or relay communication devices, the data is typically multiplexed by the relay communication device (i.e. the "last" relay communication device) that is directly connected to the access device (e.g. via Uu interface). To this end, the relay communication device may have a mapping of multiple logical channel identifiers/radio bearers being used by downstream devices or e.g. have an adaptation layer that can map communication channels for particular remote or relay communication devices to a set of logical channels/radio bearer on the direct (e.g. Uu) connection between the "last" relay communication and the access device. To this end, that "last" relay communication device is likely to aggregate and store the data coming from multiple downstream relay communication devices or remote communication devices in a common buffer. This implies that the access device cannot know based on a received scheduling request or BSR message (which reports buffer size per LCID) from which device the buffered data originates. It only knows that will be transmitted by the "last" relay communication device, but will e.g. not be able to determine if the data belongs to a particular remote device or a particular relay communication device based on the scheduling request or BSR. Of course it may be able to use higher layer information (such as adaptation layer identifiers or IP addresses), but for low-latency data buffers, it is undesirable to have to decode the higher layer first before deciding on the scheduling of additional resources. In the above embodiment, a SR from a relay communication device towards the access device 20 does not convey information about which remote communication device of a group needs immediate scheduled communication resources for latency-critical data. In this particular sub-embodiment, a PUCCH SR configuration can be created that is dedicated for transmitting SR related to one specific downstream remote communication device or a particular downstream logical channel ID or buffer ID used for PC5 communication that needs to transmit latency-critical data via the relay communication device. Thus, the type of data on which the SR configuration selection referred to above is based may also include an identity of a remote communication device or a logical channel ID or buffer ID. Then, different scheduling request configurations may be selected depending on the type of data to be transmitted, wherein the type of data may include the identity of a remote device or logical channel ID or buffer ID for which the data is relayed. This has a benefit that when the access device 20 receives this particular SR signal from the relay communication device, it immediately knows which remote communication device or downstream logical channel or buffer has latency-critical data to send and can immediately schedule communication resources for all relay communication devices involved in the indirect connection to that remote communication device and also for the remote communication device itself to transmit this data to its parent relay communication device. Note that this remote communication device may be itself acting as a relay communication device also. As an additional option, the access devices schedules resources dedicated to transmitting low-latency data, and this may be done per remote communication device or relay communication device that has low-latency data to transmit or for which a bottleneck has been identified. This may include scheduling resources from a sidelink resource pool with a very short repetition interval or in separate frequency range to reduce contention. Also as another option, a separate scheduling request message over PC5/sidelink may be used. In case of such sidelink scheduling request, different configurations may be used (e.g. configured by the access device in the relay communication device or remote communication device, or by a relay communication itself after which the information about the scheduling request configuration is transmitted to the remote communication devices or downstream relay communication device) so that a relay communication device can identify based on a received sidelink scheduling request to which remote communication or downstream relay communication device, or logical channel or buffer it applies. Additionally, after receiving a sidelink scheduling request, the relay communication device may allocate resources to fetch the data from the buffer of the downstream remote communication device or relay communication device. In case of low-latency data, a similar mechanism as defined above may be used whereby buffer capacity information is sent along with the buffered data.

In yet another embodiment, buffer capacity information is reported by a relay communication device using a D2D message, for example a PC5 discovery announce message or PC5 discovery response message, to one or more peer communication devices that use this information along with other information such as measured signal strength of received communication messages to control the selection and/or reselection of a relay communication device. Using this information, the peer communication device is enabled to (re)select an optimal relay for its indirect communication needs thus contributing to the process of optimal scheduling and distribution of communication resources in the wireless network. The peer communication device may be a relay communication device, or a remote communication device, or an OoC communication device. The D2D message type used for communicating buffer capacity information may be a PC5 discovery response message (model B discovery), or it may be a PC5 discovery announce message (model A discovery). The buffer capacity information may be encoded in any of the ways previously mentioned. It may also be encoded as part of a combined value "relay load" that indicates a level of load on the resources of the relay used for its relaying-related operations or overall computation and communication operations. Multiple such resource levels possibly in combination with one or more combined values of relay load may also be reported in a single message. These resources reported or used in combined relay load values may be one or more of: processing capacity, memory usage, buffer-specific memory usage, used upstream or SL or UL bandwidth, used downstream or DL bandwidth, number of active remote communication devices, etcetera. The "relay load" may also be encoded as the opposite being "relay capacity", indicating instead of used resources how much resources are still available for serving new downstream relay and/or remote communication devices. The peer communication device thus receiving buffer capacity information from multiple prospective relay communication devices may decide for a relay communication device that offers a reasonable received signal strength (e.g. RSRP) combined with sufficient buffer capacity. The peer device may have been triggered to perform relay discovery due to a timer expiration, or due to the reported current buffer capacity of its current relay communication device being below a threshold. If the peer device finds a more suitable relay it may connect to an additional relay communication device as a parent and once connected it may drop the connection to the old parent relay communication device.

In another option that can be combined with any other of the previous embodiments or options, based on received buffer capacity information (e.g. if maximum buffer capacity is being reached or if remaining memory capacity is insufficient to add an additional remote communication device or relay communication device), the access device may send a message to a relay communication device to stop making itself discoverable as a relay. Also, the criteria for doing so may be transmitted (e.g. (pre-)configured through a policy sent by the access device or by PCF) to a relay communication device, so that it can make this decision without having to consult or receive an additional message from the access device.

To summarize, methods and apparatuses have been described for cellular or other wireless networks, where relay terminal devices can be introduced to support an indirect network connection for remote terminal devices in OoC areas to thereby improve network coverage. Such relay terminal devices buffer upstream and downstream data from/ to other terminal devices that are indirectly connected. However, a relay terminal device may have a limited memory allocation for buffering of relay data. This limitation has a high impact on the optimal resource scheduling performed by network access devices. It is therefore proposed to configure the methods and apparatuses to have relay terminal devices report information about their available or maximum buffer capacity to their respective network access devices to enable optimal resource scheduling by the access devices.

While the invention has been illustrated and described in detail in the drawings and foregoing description, such illustration and description are to be considered illustrative or exemplary and not restrictive. The invention is not limited to the disclosed embodiments. The proposed enhanced scheduling can be implemented in all types of wireless networks, e.g. it can be applied to devices communicating using cellular wireless communication standards, specifically the $3^{rd}$ Generation Partnership Project (3GPP) 5G specifications. The 5G wireless communication devices can be of different types of devices, e.g. mobile phones, vehicles (for vehicle-to-vehicle (V2V) communication or more general vehicle-to-everything (V2X) communication), V2X devices, IoT hubs, IoT devices, including low-power medical sensors for health monitoring, medical (emergency) diagnosis and treatment devices, for hospital use or first-responder use, virtual reality (VR) headsets, etc.

It can also be applied to Integrated Access and Backhaul (IAB) systems. In particular mobile IAB nodes may be moving during operation and may lose connection with other IAB nodes or base stations. Thus, this may cause sudden changes in their respective capacity and load and may therefore cause one or more buffer sizes on a mobile IAB node to reach maximum buffer capacity.

Furthermore, the invention can be applied in medical applications or connected healthcare in which multiple wireless (e.g. 4G/5G) connected sensor or actuator nodes participate, in medical applications or connected healthcare in which a wireless (e.g. 4G/5G) connected equipment consumes or generates occasionally a continuous data stream of a certain average data rate, for example video, ultrasound, X-Ray, Computed Tomography (CT) imaging devices, real-time patient sensors, audio or voice or video streaming devices used by medical staff, in general IoT applications involving wireless, mobile or stationary, sensor or actuator nodes (e.g. smart city, logistics, farming, etc.), in emergency services and critical communication applications, in V2X systems, in systems for improved coverage for 5G cellular networks using high-frequency (e.g. mmWave) RF, and any other application areas of 5G communication where relaying is used.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 4 and 5 can be implemented as program code means of a computer program and/or as dedicated hardware of the commissioning device or luminaire device, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for scheduling communication resources of at least one communication device in a wireless network, wherein the apparatus comprises:

a capacity detector configured to detect a buffer capacity information signaled from the wireless network and indicating available or maximum buffer capacity of at least one relay communication device; and a scheduler configured to schedule communication resources for at least one of a transmission of upstream or downstream data for a target communication device over a device-to-device communication channel between the target communication device and the at least one relay communication device, and a transmission of upstream or downstream data for the at least one relay communication device over a device-to-device communication channel between the at least one relay communication device and another relay communication device or over a direct radio access link between the at least one relay communication device and an access device, based on the received buffer capacity information, wherein the scheduler is configured to decide based on the received buffer capacity information to add and/or remove at least one parent relay communication device for one of a relay or remote communication device in the wireless network.

2. The apparatus of claim 1, wherein the scheduler is configured to perform buffer capacity control by at least one of commanding a relay communication device to increase or decrease a buffer capacity for a specific logical channel or logical channel group, or a specific downstream relay or remote communication device, switching the relay communication device between an autonomous mode of buffer allocation and a directed mode of buffer allocation, setting a buffer allocation policy at the relay communication device, setting a reporting granularity of the relay communication device, and commanding the relay communication device to merge multiple separate buffers into one buffer allocation.

3. An access device for a wireless network, comprising an apparatus according to claim 1.

4. An apparatus for controlling scheduling of communication resources of at least one communication device in a wireless network, wherein the apparatus comprises:

a capacity detector configured to determine an available or maximum buffer capacity of a data buffer at a relay communication device; and a capacity reporter for reporting a buffer capacity information including the determined available or maximum buffer capacity to the wireless network in response to a trigger event, wherein the capacity reporter is configured to send the buffer capacity information to a network function, the buffer capacity information being forwarded to a scheduling access device of the wireless network, and wherein the scheduling access device includes a scheduler configured to decide based on the received buffer capacity information to add and/or remove at least one parent relay communication device for one of a relay or remote communication device in the wireless network.

5. The apparatus of claim 4, wherein the capacity reporter is configured to report the buffer capacity information in an absolute format or in a relative format.

6. The apparatus of claim 4, wherein the capacity reporter is configured to report the buffer capacity information for at least one of different logical channels present for at least one upstream link and/or at least one downstream link of a relay communication device, different priority classes of buffered data present in the relay communication device, and different downstream communication devices (present for the relay communication device, or to combine buffer capacity reports of one or more downstream communication devices with an own buffer capacity report.

7. The apparatus of claim 6, wherein the capacity reporter is configured to report a binary payload in which a plurality of elements are concatenated, each element corresponding to a buffer capacity report of one logical channel of the relay communication device or to include the own buffer capacity report and/or a buffer capacity report of a side-link connected communication device into a combined buffer capacity report, or to summarize buffer capacity information into a more condensed buffer capacity report, or to report pairs of logical channels or logical channel groups and related buffer capacity reports, or to report pairs of data priority classes and related buffer capacity reports, or to select more relevant or urgent buffer capacity reports for prioritized reporting, or to combine at least one buffer capacity report and at least one buffer size report into one report.

8. The apparatus of claim 4, wherein the capacity reporter is configured to include in a buffer capacity report information related to, or encode a buffer capacity report by using at least one of a buffer capacity index for a look-up table, a buffer load percentage, a mapping of reported buffer capacity to capacity categories, a flag indicating whether a buffer capacity threshold has been reached or exceeded, a compound value indicating a resource usage of the relay communication device where said value is at least partly determined by its current or a past buffer capacity, a compound value indicating a preference or ability of the relay communication device for accepting an additional remote communication device where said value is at least partly determined by its current or a past buffer capacity, including meta information about a buffer, and including specific requests triggered by buffer-related conditions.

9. The apparatus of claim 4, wherein the capacity reporter is configured to include in a buffer capacity report information related to, or encode a buffer capacity report, at least one of an index for a buffer load look-up table, a current buffer load percentage, a past buffer load, a mapping of reported buffer load to load categories, a flag indicating whether a buffer load threshold has been reached or exceeded, a compound value indicating a resource usage of the relay communication device where said value is at least partly determined by its current or a past buffer load, or a compound value indicating a preference or ability of the relay communication device for accepting an additional remote communication device where said value is at least partly determined by its current or a past buffer load.

10. The apparatus of claim 4, wherein the capacity reporter is configured to report the buffer capacity information by using at least one of or a combination of a transport protocol on top of the Internet Protocol, a message of a radio resource control protocol, a packet data unit of a packet data convergence protocol, a control element of a media access control protocol, a service data unit of a media access control protocol, and a data format of an uplink control information or a sidelink control information.

11. The apparatus of claim 4, wherein the trigger event corresponds to at least one of a change of a maximum buffer capacity on a relay communication device to a lower capacity, a change of an available buffer capacity of a data buffer, a timer-based trigger, an increase of a load of a data buffer by a predetermined percentage, fraction or data size with respect to a previous reported buffer capacity information, a receipt of a buffer capacity query from a scheduling access device or an upstream relay communication device, a change of a buffer capacity on a remote communication device, a receipt of a buffer size or capacity report from a downstream remote or relay communication device, a receipt of a buffer status message or scheduling request message from a downstream remote or relay communication device, a receipt of a communication resource request message from a downstream or relay communication device, a receipt of a discovery or status request message from a downstream device or out-of-coverage communication device, a receipt of a request from an access device, and a receipt of a recommended bit rate message or recommended bit rate query message from a downstream remote or relay communication device.

12. A relay communication device for a wireless network, comprising an apparatus according to claim 4.

13. A method of scheduling communication resources of at least one communication device in a wireless network, wherein the method comprises:

detecting buffer capacity information signaled from the wireless network and indicating available buffer capacity of at least one relay communication device;

scheduling at least one of a transmission of upstream or downstream data for a target communication device over a device-to-device communication channel between the target communication device and the at least one relay communication device, and a transmission of upstream or downstream data for the at least one relay communication device over a device-to-device communication channel between the at least one relay communication device and another relay communication device or over a direct radio access link between the at least one relay communication device and an access device, based on the detected buffer capacity information; and deciding based on the received buffer capacity information to add and/or remove at least one parent relay communication device for one of a relay or remote communication device in the wireless network.

14. A non-transitory computer program product comprising code means for producing the steps of claim 13 when run on a computer device.

15. A method of controlling scheduling of communication resources of at least one communication device in a wireless network, wherein the method comprises:

determining an available or maximum buffer capacity of a data buffer at a relay communication device;

reporting the determined available or maximum buffer capacity to the wireless network in response to a trigger event;

sending the buffer capacity information to a network function, the buffer capacity information being forwarded to a scheduling access device of the wireless network; and deciding based on the received buffer capacity information to add and/or remove at least one parent relay communication device for one of a relay or remote communication device in the wireless network.

16. A non-transitory computer program product comprising code means for producing the steps of claim 15 when run on a computer device.

\* \* \* \* \*